US008001465B2

(12) United States Patent
Kudrolli et al.

(10) Patent No.: US 8,001,465 B2
(45) Date of Patent: Aug. 16, 2011

(54) COMPACTING AN INFORMATION ARRAY DISPLAY TO COPE WITH TWO DIMENSIONAL DISPLAY SPACE CONSTRAINT

(75) Inventors: Abdus Samad Kudrolli, Mumbai (IN); Feroz Kudrolli, Mumbai (IN); Parvez Kudrolli, Mumbai (IN)

(73) Assignee: Kudrollis Software Inventions PVT. Ltd., Mumbai (IN)

( * ) Notice: Subject to any disclaimer, the term of this patent is extended or adjusted under 35 U.S.C. 154(b) by 2131 days.

(21) Appl. No.: 10/020,909

(22) Filed: Dec. 19, 2001

(65) Prior Publication Data

US 2003/0028560 A1   Feb. 6, 2003

(30) Foreign Application Priority Data

Jun. 26, 2001   (IN) .......................... 590/MUM/2001

(51) Int. Cl.
*G06F 17/00* (2006.01)
(52) U.S. Cl. ......... 715/243; 715/200; 715/244; 715/261
(58) Field of Classification Search .................. 715/500, 715/517, 518, 534, 200, 243, 244, 261
See application file for complete search history.

(56) References Cited

U.S. PATENT DOCUMENTS

| 4,486,857 | A | | 12/1984 | Heckel |
| 5,231,579 | A | | 7/1993 | Tsuchiya et al. |
| 5,621,876 | A | | 4/1997 | Odam et al. |
| 5,691,708 | A | * | 11/1997 | Batchelder et al. .......... 340/7.29 |
| 5,808,914 | A | * | 9/1998 | Shin et al. .................. 703/2 |
| 6,055,550 | A | * | 4/2000 | Wallack ................... 715/509 |
| 6,067,070 | A | | 5/2000 | Suzuki et al. |
| 6,246,442 | B1 | * | 6/2001 | Harada et al. ............... 348/569 |
| 6,279,018 | B1 | | 8/2001 | Kudrolli et al. |
| 6,300,947 | B1 | * | 10/2001 | Kanevsky ................... 715/866 |
| 6,456,305 | B1 | * | 9/2002 | Qureshi et al. .............. 715/800 |
| 6,547,830 | B1 | * | 4/2003 | Mercer ..................... 715/518 |

OTHER PUBLICATIONS

Anderson, et al., "The Table Layout Problem", SCG '99 Miami Beach Florida, copyright ACM 1999 1-58113-068-6/99/06, p. 115-123.*
Badros, et al., "Constraint Cascading Style Sheets for the Web", Technical Report UP CSE May 1, 1999, published May 1999, Revised Aug. 3, 1999, p. 1-10.*
Bos, et al., "Cascading Style Sheets, level 2", W3C Proposed Recommendation published Mar. 1998, W3C, available at http://www.w3.org/TR/1998/PR-CSS2-19980324; table of contents, p. 1-10; Sect. 8, p. 1-12; Sect. 10, p. 1-11; Sect. 18, p. 1-26.*

(Continued)

*Primary Examiner* — Amelia Rutledge
(74) *Attorney, Agent, or Firm* — Jay P. Kesan

(57) ABSTRACT

This invention relates to computer implemented methods for accommodating elements of an information array within the physical constraints of a predetermined two dimensional display space. The maldistribution and wastage of space inherent to matrix format display is sought to be minimized by allocating space based on moderated display space requirement values of larger elements. A measurement of lopsidedness of distribution of larger elements across columns and across rows is used while allocating column widths and row heights. If the display space is inadequate for displaying the array elements in matrix format, then the elements are displayed in Tall/Wall format wherein the row/column alignment of cells, respectively, is not maintained. The information array elements may include text, image or both. Methods such as font size reduction, text abbreviation and image size reduction are used in combination with space allocation methods to fit the array elements into corresponding cells in the display space.

20 Claims, 12 Drawing Sheets

| Mon | Tue | Wednesday | Thursday | Friday | Saturday | Sun |
|---|---|---|---|---|---|---|
| 1*Prepr Plan JanTo Oct | 2*Thn Meet 9*Sem inar | 3*Meeting WthMrAsh At11Am* ShnkrsPrty | 4*DraftPres entationFor ABCSenior Mangrs&VPs | 5*Coo rdinatic Betwn Sham | 6*VstPhn Complex* 1-DayCrkt | 7* 14* Frm |
| 8*Flght ToDelh At2Pm *MtSh | At Rg Htl | AtShangril 10*Seminr *GlblTrnds *StrtgyMdl | 11*RtrnFlght At8Am*Jay 18*FnlAcnts DirectorsRprt | &Suzn 12*Me tngMD *Revw | 13*Divis ionalRevw *IMCMeet | 21* 28* |
| 15*Rv Work Progres WithRo tomac Develo pmntT 22*Pun Trip 29*Pun Fl11A | 16* Lectur ABM/ Aftrn Sesn 23* Reprt On 5 Years Prspct 30*Pn | 17*Lecture ABMAMor ningSesion UptoLunch 24*German Delegation Arives 8Am *Fctry 31*SeeOff GrmAt8Pm | Draft Notices AgndWthRm 25*Coordntn Meeting*Din nerWthGrmn Delegation At Taj Hotel 1*ReprtToCh mbrs*Meetg EqpmtSplrs AtThan12Pm | 19*Md Ch-Up 26*Rev iewWt Sham 2*Drft Letter ToCha irman | ingAt8Pm 20*HlpAl WithStuds *BuyMlnx Microwav 27*AtlIm 3*Meeting DelcoMD *VisitDelc Plnt*Dntst At5Pm | 4* Wth Mitl Shr &Ge orge Fami lies |

OTHER PUBLICATIONS

WIPO Pub. No. WO 01/09832, Inventor: David E. Hollingworth & Robert h. Halstead,Jr., Title: Processing Layout of Text Graphical Objects, Pub. Date: Feb. 8, 2001.

WIPO Pub. No. WO 01/09834, Inventor: Robert H. Halstead, Jr. & David E. Hollingsworth, Title: Graphical Objects with Minimum and Preferred Sizes, Pub. Date: Feb. 8, 2001.

WIPO Pub. No. WO 01/09835, Inventor: Robert H. Halstead, Jr. & David E. Hollingsworth, Title:Graphical Objects With Stretch and Compression Properties, Pub. Date: Feb. 8, 2001.

WIPO Pub. No. WO 01/09838, Inventor: Robert H. Halstead, Jr. & David E. Hollingsworth, Title:Graphical Objects Having Origins Defined With Elasticity, Pub. Date: Feb. 8, 2001.

WIPO Pub. No. WO 01/09839, Inventor: Robert H. Halstead, Jr. & David E. Hollingsworth, Title:Multiple Pass Layout of Graphical Objects With Elastics, Pub. Date: Feb. 8, 2001.

WIPO Pub. No. WO 01/09840, Inventor: Robert H. Halstead, Jr. Title:Using Elastic Values for Graphical Objects, Pub. Date: Feb. 8, 2001.

* cited by examiner

Investor Vs Speculator

| Category | Parameter | Investor | Speculator |
|---|---|---|---|
| Objective parameter | Holding Period | An investor has a relatively longer planning horizon, with holding period of at least one year | A speculator has a very short planning horizon - from a few days to a few months and involving frequent trading |
| | Sourcing of funds - Borrowed or own funds | An investor uses his own funds & eschews borrowed funds | A speculator normally resorts to borrowings to supplement his personal resources |
| Subjective parameter | Risk profile | An investor normally assumes moderate risk. Rarely does he knowingly assume high risk | A speculator is ordinarily willing to assume high risk |
| | Return expectation | An investor usually seeks a rate of return higher than that from gilt edged securities and which is commensurate with the limited risk assumed by him | A speculator expects a high rate of return for the high risk borne by him |
| | Basis of decisions | An investor studies the fundamental factors and attempts a careful evaluation of the prospects of the business | A speculator relies more on market rumours or technical charts |

FIG. 4 (Prior Art)

| Catgry | Parameter | Investor | Speculator |
|---|---|---|---|
| Objective Parameter | Holding Period | An Investor Has A Relatively Longer PlanningHorizonWithHoldingPeriodOf At Least One Year | ASpeculatorHasAVeryShortPlang Horizon-FromAFewDaysToAFew Months&InvolvingFrequentTradg |
| | SourcingOfFunds-BrwdOrOwnFnds | AnInvestorUsesHisOwnFunds&Eschews Borrowed Funds | ASpeculatorNrmlyRsrtsToBrwngs ToSupplemtHisPersonalResources |
| Subjective Parameter | Risk profile | AnInvestorNormalyAsumesModerateRisk.RarelyDoesHeKnowglyAssumeHighRisk | ASpeculatorIsOrdinarilyWilling To Assume High Risk |
| | ReturnExpecttn | AnInvestorUslySeeksARateOfRtrnHghr ThanThatFromGiltEdgedSecrts&WhchIs ComensrtWithTheLmtdRiskAsmdByHim | ASpeculatorExpectsAHighRate OfReturnForTheHighRiskBorne By Him |
| | BasisOfDecsns | AnInvestorStudiesTheFundamtalFactrs&Atmpts ACarefulEvaluationOfTheProspectsOfTheBsns | ASpeculatorReliesMoreOnMarket Rumours Or Technical Charts |

FIG. 5

| Category | Parameter | Investor | Speculator |
|---|---|---|---|
| Objecti Parame | Holding Period | AnInvestorHasARelativelyLongerPlanning HorizonWithHoldingPeriodOfAtLeast1Year | ASpeculatorHasAVeryShortPlanng Horizon-FromAFewDaysToAFew Months&InvolvingFrequentTradg |
| | SourcingOfFunds-Borrowed OrOwnFunds | AnInvestorUsesHisOwnFunds&Eschews Borrowed Funds | ASpeculatorNormalyRsrtsToBorow ngsToSuplemtHisPersonalResourcs |
| Subjecti Parame | Risk profile | AnInvestorNormalyAsumesModerateRisk.Rarely Does He Knowingly Assume High Risk | ASpeculatorIsOrdinarilyWillingTo Assume High Risk |
| | ReturnExpectation | AnInvestorUsualySeeksARateOfReturnHighr ThanThatFromGiltEdgedSecrts&WhchIsCo mensurateWithTheLimitedRiskAsmdByHim | ASpeculatorExpectsAHighRateOf RetrnForTheHighRiskBornByHim |
| | BasisOfDecisions | AnInvestorStudiesTheFundamtlFctrs&Atmpts ACarefulEvaluationOfTheProspctsOfTheBsns | ASpeculatorReliesMoreOnMarket Rumours Or Technical Charts |

FIG. 6

| Category | Parameter | Investor | Speculator |
|---|---|---|---|
| Objective Parameter | Holding Period | AnInvestorHasARelativelyLonger Planning Horizon With Holding Period Of At Least One Year | ASpeculatorHasAVeryShortPlang Horizon-FromAFewDaysToAFew Months&InvolvingFrequentTradg |
| | SourcingOfFunds-BrwdOrOwnFnds | AnInvestorUsesHisOwnFunds& Eschews Borrowed Funds | ASpeculatorNrmlyRsrtsToBrwngs ToSupplemtHisPersonalResources |
| Subjective Parameter | Risk Profile | AnInvestorNormalyAsumesMdrtRisk .RarlyDoesHeKnwglyAsumHighRisk | ASpeculatorIsOrdinarilyWilling To Assume High Risk |
| | ReturnExpectatn | AnInvestorUsuallySeeksARateOf RetrnHghrThanThatFromGiltEdgd Securities&WhichIsCommensurate WithTheLimitedRiskAsumdByHim | ASpeculatorExpectsAHighRate OfReturnForTheHighRiskBorne By Him |
| | BasisOfDecisns | AnInvestorStudiesTheFundamental Factors&AtemptsACarefulEvaluatn Of The Prospects Of The Business | ASpeculatorReliesMoreOnMarket Rumours Or Technical Charts |

FIG. 7

| Category | Parameter | Investor | Speculator |
|---|---|---|---|
| Objective Parameter | Holding Period | AnInvestorHasARelativelyLonger Planning Horizon With Holding Period Of At Least One Year | ASpeculatorHasAVeryShrtPlng Hrzn-FromAFewDaysToAFew Months&InvolvgFrequentTrdg |
| | SourcingOfFunds-BorwdOrOwnFnds | AnInvestorUsesHisOwnFunds& Eschews Borrowed Funds | ASpeculatorNrmlyRsrtsToBrwngs ToSupplemtHisPersonalResources |
| Subjective Parameter | Risk Profile | AnInvestorNormalyAsumesMdrtRisk .RarlyDoesHeKnwglyAsumHighRisk | ASpeculatorIsOrdinarilyWilling To Assume High Risk |
| | Return Expectation | AnInvestorUsualySeeksARateOfRetrn HigherThanThatFromGiltEdgedSecur ities&WhichIsCommensurateWithThe Limited Risk Assumed By Him | ASpeculatorExpectsAHighRate Of Return For The High Risk Borne By Him |
| | Basis Of Decisions | An Investor Studies The Fundamental Factors&AttemptsACarefulEvaluation Of The Prospects Of The Business | ASpeculatorReliesMoreOnMrkt Rumours Or Technical Charts |

FIG. 8

| Category | Parameter | Investor | Speculator |
|---|---|---|---|
| Objective Parameter | HoldingPeriod | AnInvestorHasARelativelyLongerPlng HoriznWithHldgPerdOfAtLeast1Year | ASpeculatorHasAVeryShortPlanng Horizon-FromAFewDaysToAFew Months&InvolvingFrequentTrading |
| | SourcingOfFunds-BorrowedOrOwn Funds | An Investor Uses His Own Funds & Eschews Borrowed Funds | ASpeculatorNrmlyRsrtsToBrwngs ToSupplemtHisPersonalResources |
| Subjectiv Parameter | Risk Profile | AnInvestorNormalyAsumesModrtRisk .RarelyDoesHeKnwglyAsumHighRisk | ASpeculatorIsOrdinarilyWilling To Assume High Risk |
| | ReturnExpectation | AnInvestorUslySeeksARateOfRtrnHghr ThanThatFromGiltEdgedSecrts&Whchls ComensrtWithTheLmtdRiskAsmdByHim | ASpeculatorExpectsAHighRate OfReturnForTheHighRiskBorne By Him |
| | BasisOfDcsns | AnInvestorStudiesTheFundamtalFactors &AttemptsACarefulEvaluationOfThe Prospects Of The Business | ASpeculatorReliesMoreOnMarket Rumours Or Technical Charts |

FIG. 9

Investor Vs Speculator (Turned)

| Category | Objective parameter | | Subjective parameter | | |
|---|---|---|---|---|---|
| Parameter | Holding Period | Sourcing of funds - Borrowed or own funds | Risk profile | Return expectation | Basis of decisions |
| Investor | An investor has a relatively longer planning horizon, with holding period of at least one year | An investor uses his own funds & eschews borrowed funds | An investor normally assumes moderate risk. Rarely does he knowingly assume high risk | An investor usually seeks a rate of return higher than that from gilt edged securities and which is commensurate with the limited risk assumed by him | An investor studies the fundamental factors and attempts a careful evaluation of the prospects of the business |
| Speculator | A speculator has a very short planning horizon - from a few days to a few months and involving frequent trading | A speculator normally resorts to borrowings to supplement his personal resources | A speculator is ordinarily willing to assume high risk | A speculator expects a high rate of return for the high risk borne by him | A speculator relies more on market rumours or technical charts |

FIG. 10 (Prior Art)

| Category | Objective parameter | | Subjective parameter | | |
|---|---|---|---|---|---|
| Parameter | Holding Period | SourcingOfFunds-BorwdOrOwnFnds | Risk Profile | ReturnExpectation | BasisOfDecisns |
| Investor | An Investor Has ARelativelyLngr PlanngHorizon WithHoldgPerd Of At Least One Year | AnInvestorUses His Own Funds & Eschews Borrowed Funds | AnInvestorNormallyAsumesModerateRisk.Rarely DoesHeKnwgly Assume High Risk | An Investor Usually SeeksARateOfRetrn HghrThanThatFrom GiltEdgedSecurities &WhichIsComensrt WithTheLimitdRisk Assumed By Him | AnInvestorStuds TheFundamental Factors&Atmpts ACarefulEvaltn OfTheProspects Of The Business |
| Speculator | ASpeculatorHas AVeryShortPlang Horizon-FromA FewDaysToAFew Months&Involvg Frequent Trading | ASpeculatorNormallyResortsTo Borrowings To Supplement His PersonalResrcs | ASpeculatorIs OrdinarilyWillg ToAssumeHigh Risk | ASpeculatrExpcts A High Rate Of Return For The HighRiskBorneBy Him | ASpeculatorRels More On Market Rumours Or Technical Charts |

FIG. 11

| Ctgry | ObjectiveParamtr | | Subjective parameter | | |
|---|---|---|---|---|---|
| Para meter | Holding Period | Sourcing Of Funds -Borowed OrOwnFn | Risk Profile | Return Expecttn | Basis OfDeci sions |
| Invst | AnInvst HasARe latively Longer Planng Horizon WthHol dingPrd OfAtLst 1 Year | AnInvst Uses HisOwn Funds &Eschw Borowd Funds | AnInvst Normaly Asumes Moderat Risk.Ra relyDs HKnow inglyAss umeHgh Risk | An Investor UslySeeks A Rate Of RetrnHghr Than That FrmGltEdg Securities &WhichIs Comensurt WithTheLi mitedRisk AsmByHm | AnInvstr Studies TheFund amental Factors &Atmpt ACareful Evaluatn OfThePr ospctsOf TheBsns |
| Spec ulator | ASpecultr HasAVry ShortPlng Horizon -FromA Few Days To A Few Months& InvolvgFr equentTrd | ASpcltr Normaly Resorts ToBorr owings ToSupl ement HsPrsnl Resrcs | ASpecu lator Is Ordinrly Willing ToAsum High Risk | ASpecltr Expects A High Rate Of Return For The HighRisk Borne By Him | ASpecu latorRls MoreOn Market Rumrs OrTech nical Charts |

FIG. 12

| Ctgry | ObjectiveParamtr | | Subjective parameter | | |
|---|---|---|---|---|---|
| Para meter | Holding Period | Sourcing Of Funds -Borowed OrOwnFn | Risk Profile | Return Expecttn | Basis OfDeci sions |
| Invst | AnInvst HasARe latively Longer Planng Horizon WthHol dingPrd OfAtLst 1 Year | AnInvst Uses HisOwn Funds &Eschw Borowd Funds | AnInvst Normaly Asumes Moderat Risk.Ra relyDs HKnow inglyAss umeHgh Risk | AnInvestr UslySks A Rate Of RtrnHghr Than That FrmGltEd Securits& WhIsCom nsrtWith ThLmtRs AsByHm | AnInvst Studies ThFund mntlFctr &Atmpt ACarefl Evaltn Of The PrspcOf ThBsns |
| Spec ulator | ASpecltr HsAVry ShrtPlng Horizon- FrAFw Days To AFwMn &Invlvg FrqntTr | ASpcltr Normaly Resorts ToBorr owings ToSupl ement HsPrsnl Resrcs | ASpecu lator Is Ordinrly Willing ToAsum High Risk | ASpecltr Expects A High Rate Of Return For The HighRisk Borne By Him | ASpecu latorRls MoreOn Market Rumrs OrTech nical Charts |

FIG. 13

Cost Analysis

| # | Cost per rupee of net sales | Mayo Iron and Steel Company | Mexico Steel | Dynamic Steel | Apex Steel | Derby Metal Company |
|---|---|---|---|---|---|---|
| 1 | Raw materials and stores etc. | 37.22 | 34.29 | 33.80 | 37.08 | 38.08 |
| 2 | Power and fuel | 7.39 | 8.07 | 7.49 | 7.53 | 9.36 |
| 3 | Wages and salaries | 11.09 | 10.66 | 11.08 | 10.92 | 11.97 |
| 4 | Other operating expenses | 13.63 | 12.48 | 11.29 | 11.97 | 11.83 |
| 5 | Depreciation | 4.77 | 5.90 | 5.28 | 5.39 | 5.62 |
| 6 | Manufacturing cost of production | 74.10 | 71.40 | 68.94 | 72.90 | 76.86 |
| 7 | Change in stock of finished goods & contracts in progress | 1.09 | 0.43 | -0.79 | -0.68 | -0.21 |
| 8 | Selling costs | 9.02 | 10.51 | 10.12 | 10.52 | 10.51 |
| 9 | Cost of sales | 84.21 | 82.34 | 78.27 | 82.74 | 87.16 |
| 10 | Administrative and overhead costs | 11.50 | 9.17 | 8.65 | 8.87 | 9.42 |
| 11 | Total cost | 95.70 | 91.51 | 86.92 | 91.61 | 96.59 |
| 12 | Operating profit | 4.30 | 8.49 | 13.08 | 8.39 | 3.41 |
| 13 | Net sales | 100.00 | 100.00 | 100.00 | 100.00 | 100.00 |

FIG. 14 (Prior Art)

| # | CostPerRupee Of Net Sales | Mayo Iron &StlCompany | Mexic Steel | Dynm Steel | Apex Steel | Derby MetlCoy |
|---|---|---|---|---|---|---|
| 1 | Raw Materials &StoresEtc. | 37.22 | 34.29 | 33.80 | 37.08 | 38.08 |
| 2 | Power&Fuel | 7.39 | 8.07 | 7.49 | 7.53 | 9.36 |
| 3 | Wages&Salrs | 11.09 | 10.66 | 11.08 | 10.92 | 11.97 |
| 4 | OthrOprtgExpns | 13.63 | 12.48 | 11.29 | 11.97 | 11.83 |
| 5 | Depreciation | 4.77 | 5.90 | 5.28 | 5.39 | 5.62 |
| 6 | Manufacturg CostOfPrdctn | 74.10 | 71.40 | 68.94 | 72.90 | 76.86 |
| 7 | ChangeInStok OfFnshdGds &CntrctsInPrg | 1.09 | 0.43 | -0.79 | -0.68 | -0.21 |
| 8 | Selling costs | 9.02 | 10.51 | 10.12 | 10.52 | 10.51 |
| 9 | Cost of sales | 84.21 | 82.34 | 78.27 | 82.74 | 87.16 |
| 10 | Administrativ &OverhdCsts | 11.50 | 9.17 | 8.65 | 8.87 | 9.42 |
| 11 | Total cost | 95.70 | 91.51 | 86.92 | 91.61 | 96.59 |
| 12 | OperatgProfit | 4.30 | 8.49 | 13.08 | 8.39 | 3.41 |
| 13 | Net sales | 100.00 | 100.00 | 100.00 | 100.0 | 100.00 |

FIG. 15

Calender2

| Monday | Tuesday | Wednesday | Thursday | Friday | Saturday | Sunday |
|---|---|---|---|---|---|---|
| 1* Prepare plan January to October | 2* Thane meet | 3* Meeting with Mr Ashok at 11am * Shanker's party at Shangrila | 4* Draft presentation for ABC Senior Managers & VPs | 5* Coordination between Sham and Suzan | 6* Visit Pheonix Complex * One-day cricket | 7* |
| 8* Flight to Delhi at 2pm * Meet Shah | 9* Seminar at Regent Hotel | 10* Seminar * Global trends * Strategy models | 11* Return Flight at 8am * Jay party | 12* Meeting MD * Review | 13* Divisional review * IMC meeting at 8pm | 14* Farm house |
| 15* Review work progress with Rotomac development team | 16* Lecture at BMA afternoon session | 17* Lecture at BMA morning session upto lunch | 18* Final accounts Directors Report Draft Notices Agenda with Ram | 19* Medical check-up | 20* Help Alyina with studies * Buy Mollinex Microwave | 21* |
| 22* Pune trip | 23* Report on 5 years perspective | 24* German Delegation arrives 8am * Factory visit | 25* Coordination meeting * Dinner with German Delegation at Taj Hotel | 26* Review with Sham | 27* At home | 28* |
| 29* Pune flight 11am | 30* Pune | 31* See off Germans at 8pm | 1* Report to Chambers * Meeting equipment suppliers at Thane 12pm | 2* Draft letter to Chairman | 3* Meeting Delco MD * Visit Delco plant * Dentist at 5pm | 4* With Mittal Sharma & George families |

FIG. 16 (Prior Art)

| Monday | Tuesday | Wednesday | Thursday | Friday | Saturday | Sunday |
|---|---|---|---|---|---|---|
| 1* Prepare Plan January To October | 2*ThaneMeet | 3*MeetgWith MrAshokAt11 Am*Shankers PartyAtShangrl | 4*DraftPresentationFrABC SeniorMangrs & VPs | 5*Coordination Between Sham &Suzan | 6*VisitPheonx Complex*One -DayCricket | 7* |
| 8*FlightTo DelhiAt2Pm *MeetShah | 9*Seminr At Regent Hotel | 10*Seminar* Global Trends * Strategy Models | 11* Return FlightAt8Am * Jay Party | 12*Meetg MD * Review | 13*Divisionl Review*IMC MeetingAt8 Pm | 14* Farm House |
| 15*Review WorkProgrs WithRotomc DvlpmtTm | 16* Lecture AtBMAAfte rnoonSession | 17*LectureAt BMAMorning Session Upto Lunch | 18*FinlAcnts DirectorsRprt Draft Notices AgndWithRm | 19*Medicl Check-Up | 20*HelpAlyn With Studies *BuyMolinex Microwave | 21* |
| 22* Pune Trip | 23* Report On 5 Years Perspective | 24*GermnDlgtn Arrives 8Am* FctryVs | 25*Coordinatn Meetg*Dinner WithGrmnDel egatnAtTajHtl | 26*Review With Sham | 27*AtHome | 28* |
| 29* Pune Flight11Am | 30* Pune | 31* See Off Germans At 8 Pm | 1*ReprtToCh ambrs*Meetg EquipmtSplrs AtThan12Pm | 2* Draft Letter To Chairman | 3*MeetgDelc MD*VistDlc Plant*Dentist At 5 Pm | 4*WithMital Sharma&Ge orge Famls |

FIG. 17

| Monday | Tuesday | Wednesday | Thursday | Friday | Saturday | Sunday |
|---|---|---|---|---|---|---|
| 1*Prepar PlanJnry ToOctbr | 2*Thane Meet | 3*Meeting WthMrAs At11Am *ShnkrsPr AtShangril | 4*DraftPr esentation For ABC SenrMan agers&VP | 5*Coor dination Between Sham& Suzan | 6*VisitPhe onixCmplx *One-Day Cricket | 7* |
| 8*Flight To Delhi At 2 Pm *MtShh | 9*Se minr AtRg Hotel | 10*Semnr * Global Trnds*Str Models | 11*Retrn Flight At 8Am*Jay Party | 12*Mee tingMD *Revw | 13*Dvsnl Review* IMCMtg At8Pm | 14*Farm House |
| 15*Revw WrkPrgrs WthRtmc Develop mentTm | 16*Lctr AtBMA Afternn Session | 17*Lectur At BMA MrngSesn UptoLnch | 18*FinlAc ountsDrctr ReportDrft NtcsAgnd With Ram | 19*Med icalChek - Up | 20*Help AlynWith Studies * BuyMlnx Microwav | 21* |
| 22*Pune Trip | 23*Rprt On5Yrs Perspctv | 24*German DelgtnArvs 8Am *Fctr Visit | 25*Crdntn Meetg*Dnr WithGermn Delegation AtTajHotel | 26*Rev iewWth Sham | 27* At Home | 28* |
| 29*Pune Flight 11 Am | 30* Pune | 31* See OfGrmns At 8 Pm | 1*ReprtTo Chambers* MtgEqpmt SuppliersAt Than12Pm | 2*Draft Letter ToChai rman | 3*Meetg DelcoMD *VistDelc Plnt*Den tistAt5Pm | 4*WithMtl Sharma& GeorgFam ilies |

FIG. 18

| Monday | Tuesday | Wed | Thursday | Friday | Saturday | Sunday |
|---|---|---|---|---|---|---|
| 1*Prepr PlanJanuaryTo October | 2*Than Meet | 3*Meeting WthMrAsh At11Am* ShnkrsPrt AtShangri | 4*DraftPr esentation For ABC SenrMan agrs&VPs | 5*Coor dination Betwn Sham &Suzan | 6*VisitPh onixCmplx *One-Day Cricket | 7* |
| 8*Flight To Delhi At 2 Pm *MtShh | 9*Ser inar AtRg Hotel | 10*Smnr *GlobalTr ends*Str ategyMdl | 11*Retrn Flight At 8Am*Jay Party | 12*Mee tingMD *Revw | 13*Dvsnl Review *IMCMtg At 8 Pm | 14*Frm Hs |
| 15*Revw WrkPrgrs WthRtmc Developm entTeam | 16*Lctr AtBMA Afternn Sesion | 17*Lectur At BMA Morning Session UptoLnch | 18*FinlAco untsDirctrs ReportDrft NotcsAgnd With Ram | 19*Med icalChk - Up | 20*Help AlynWith Studies* BuyMlnx Microwav | 21* |
| 22*Pune Trip | 23*Rprt On5Yrs Perspe ctive | 24*German Delegation Arrives8Am *Fctry Visit | 25*Crdntn Meetg*Dinr WithGermn Delegation AtTajHotel | 26*Rev iewWt Sham | 27* At Home | 28* |
| 29*Pune Flight 11 Am | 30* Pune | 31* See OGerma nsAt8Pm | 1*ReportTo Chambers* MtgEqpmt SuppliersAt Than12Pm | 2*Draft Letter ToChai rman | 3*Meetg DelcoMD *VistDelc Plnt*Dnts At5Pm | 4*WithMtl Sharma &George Fa mili |

FIG. 19

| Monday | Tuesday | Wed | Thursday | Friday | Saturday | Sunday |
|---|---|---|---|---|---|---|
| 1*Prepare PlanJanry ToOctobr | 2*Thane Meet | 3*Meeting WthMrAsh At11Am* ShnkrsPrty AtShangril | 4*DraftPre sentation ForABCSe niorMangrs & VPs | 5*Coord ination Between Sham & Suzan | 6*VistPh onixCmplx *One-Day Cricket | 7* |
| 8*Flight To Delhi At2Pm* MeetShah | 9*Sen inar AtRg Hotel | 10*Seminr *GlobalTr ends*Strtg Models | 11*Return FlightAt8 Am * Jay Party | 12*Meet ingMD *Review | 13*Divis ionalRevw *IMCMeet ingAt8Pm | 14*Farm Ho use |
| 15*Revw WrkPrgrs WithRtmc Developm entTeam | 16*Lectr AtBMA Afternn Session | 17*Lecture ABMAMo rningSesn UptoLunch | 18*FinalAc ountsDrctrs ReportDrft NotcsAgnd With Ram | 19*Mdcl Check - Up | 20* Help AlyinWith Studies * BuyMolnx Microwav | 21* |
| 22*Pune Trip | 23*Reprt On5Yrs Perspctv | 24*Germn Delegation Arivs8Am *Fctry Visit | 25*Crdntn Meetg*Dnr WithGrmn Delegation AtTajHotel | 26*Rvw With Sham | 27* At Home | 28* |
| 29*Pune Flight 11 Am | 30*Pune | 31*SeeOff Germans At 8 Pm | 1*ReprtTo Chambers* MtgEqpmt SupliersAt Than12Pm | 2*Draft Letter ToChair man | 3*Meeting DelcoMD *VisitDelc Plnt*Dntst At 5 Pm | 4* With MitlShrm &George Fam ilies |

FIG. 20

| Mon | Tue | Wednesday | Thursday | Friday | Saturday | Sun |
|---|---|---|---|---|---|---|
| 1*Prepr Plan JanTo Oct | 2*Thn Meet 9*Sem inar | 3*Meeting WthMrAsh At11Am* ShnkrsPrty | 4*DraftPres entationFor ABCSenior Mangrs&VPs | 5*Coo rdinatic Betwn Sham | 6*VstPhn Complex* 1-DayCrkt | 7* 14* Frm |
| 8*Flght ToDelh At2Pm *MtSh | At Rg Htl | AtShangril 10*Seminr *GlblTrnds *StrtgyMdl | 11*RtrnFlght At8Am*Jay 18*FnlAcnts DirectorsRprt | &Suzn 12*Me tngMD *Revw | 13*Divis ionalRevw *IMCMeet ingAt8Pm | 21* 28* |
| 15*Rv Work Progres WithRo tomac Develo pmntT | 16* Lectur ABM/ Aftrn Sesn 23* Reprt | 17*Lecture ABMAMor ningSesion UptoLunch 24*German Delegation Arives | Draft Notices AgndWthRm 25*Coordntn Meeting*Din nerWthGrmn Delegation At Taj Hotel | 19*Md Ch-Up 26*Rev iewWt Sham | 20*HlpAl WithStuds *BuyMlnx Microwav 27*AtHm 3*Meeting | 4* Wth Mitl Shr &Ge orge Fami |
| 22*Pun Trip 29*Pun Fl11A | On 5 Years Prspct 30*Pn | 8Am *Fctry 31*SeeOff GrmAt8Pm | 1*ReprtToCh mbrs*Meetg EqpmtSplrs AtThan12Pm | 2*Drft Letter ToCha irman | DelcoMD *VisitDelc Plnt*Dntst At5Pm | lies |

FIG. 21

| Monday | Tuesday | Wednesday | Thursday | Friday | Saturday | Sunday |
|---|---|---|---|---|---|---|
| 1*Prpr Plan JanTo Oct | 2* Th Mt | 3*MeetgWith MrAshokAt11 Am*Shankers PartyAtShngrl | 4*DraftPre sentationFr ABCSenior Mngr&VPs | 5*Coord ination Between Shm&Sz | 6*VisitPheo nixComplex *One-Day Crkt | 7* |
| 8*Flight To Delhi At 2 Pm *MtShh | 9*Sem inar AtRgn Hotel | 10*Seminr *GlobalTr ends*Strtg Models | 11*Rtrn Flight At8Am *JayPrty | 12*Mc eting MD *Rvw | 13*Divis ionalRevw *IMCMeet ingAt8Pm | 14*F |
| 15*Review WorkPrgrs WithRotmc DvlpmtTm | 16*Lct ABMA Aftrnn Sesion | 17*Lectr AtBMA MrngSsn UptLnch | 18*FnlAcnts DirectrsRprt Draft Notices AgndWthRm | 19*M dCh- | 20*HlpAly WithStuds *BuyMlnx Microwave | 21 |
| 22* Pn Trp | 23*Reprt On5Yrs Perspctv | 24*GermanDele gationArrives 8Am*FctrVs | 25*CoordntnMeetg *DinerWithGerman DelegatnAtTajHotl | 26* Revw WtSh | 27* At H | 28 |
| 29* Pun Flgh 11 | 30 Pn | 31* SeeOf Grmn At 8 | 1*ReportToCha mbers*Meeting EquipmtSuplrs AtThane12Pm | 2*Drf Letter TCha irman | 3* Meeting DelcoMD* VisitDelcPlnt *DntsAt5Pm | 4*WithMitl Sharma&Ge orgeFa milies |

FIG. 22

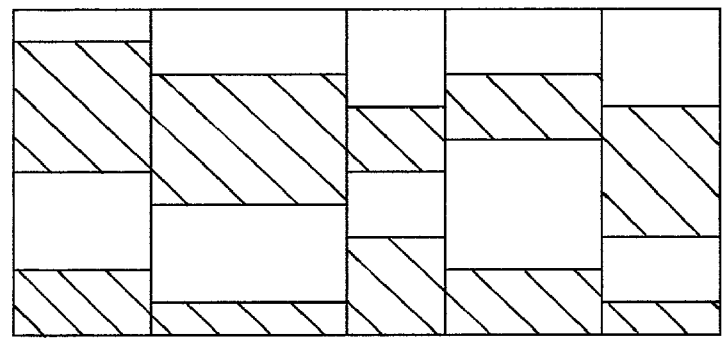

FIG. 23

COMPACTING AN INFORMATION ARRAY DISPLAY TO COPE WITH TWO DIMENSIONAL DISPLAY SPACE CONSTRAINT

Foreign Priority Application: Patent Application Number: 590/MUM/2001, Filing Date: Jun. 26, 2001, Country: India

FIELD OF THE INVENTION

This invention relates to computer implemented methods for accommodating elements of an information array within the physical constraints of a predetermined two dimensional display space. More specifically, the methods relate to computation and allocation of space to individual cells of a display format and formatting and fitting the corresponding information array elements, comprising text, images or both, into said cells.

BACKGROUND OF THE INVENTION

With the widespread use of computers and networks (e.g., the Internet) vast amounts of information are getting generated and exchanged throughout the world. Organizing and managing all this information is a major challenge. A very important and widely used method of organizing information, for efficient reading and comprehension by humans, is to arrange information elements into two dimensional formats like matrices and tables. The advantage of such tabulated formats is that the two dimensional display structure can be used to quickly convey the relationships between various information elements and to make comparisons.

While reading tabulated information on a display screen or printed page it is a convenience if such information can be read from one view or page rather than having to go to the next view or page or having to scroll. Scrolling is generally resorted to if the dimensions of any display format exceed those of the display screen or the display window. Even if a single view or page is not feasible it is desirable to minimize the number of views or pages or the proportion of scrolling, through compacted display formats. Compacted presentation of information may also be useful when several related documents or composite documents (containing tabular information, free flowing textual matter, graphs and pictures) have to be accommodated within a predetermined display or print space constraint.

Column and row sizes in interactively created matrices are generally determined without prior precise calculation of display space requirement of information that will ultimately appear in each cell. Often users have to manually resize the columns and rows by trial and error until a most acceptable result is obtained. Sometimes text in some cells may need to be manually changed or abbreviated to avoid overflow and truncation of information. Often there is wastage of space in cells.

The prior art methods for rendering information array displays do not describe methods for accommodating the information array within a two dimensional display space constraint especially when the available display space is less than the display space requirement of the information array elements. Generally, even if a two dimensional space constraint (i.e., width constraint and height constraint) is specified it is merely taken as an indicative and non-binding guideline. For example, if a limited two dimensional space is specified for displaying an information array, only the width constraint guideline may be adhered to and the height used for displaying may be extended as required without regard to the specified height constraint.

Thus, methods are needed for rendering information array displays within predetermined two dimensional space constraints such that loss of readability (or reading comfort) and wastage of space are minimized. Information array elements may include images in addition to or instead of text. Methods are needed to strike a balance between the reduction of image sizes and reduction of text font sizes within information array display to cope with severe display space constraint situations.

U.S. Pat. No. 4,486,857 is designed to compact and display entries from one record at a time. The methods of that invention are not designed for allocating space for displaying each element of a two dimensional information array within a two dimensional space constraint.

U.S. Pat. No. 5,231,579 describes methods for compressing cell data such that the data fits into the available cell space. Said methods include, blank space deletion, synonym conversion, and character size reduction. However these methods are largely interactive and cell sizes are not determined with reference to the display space requirement in the cells.

U.S. Pat. No. 5,621,876 relates to "Method And Apparatus For Modifying A Display Matrix In A Computer Window By Adding One Column Or Row At A Time". The method includes computing reduced width or height in existing columns or rows to accommodate the added column or row. However, reduced width or height of columns or rows is not computed with reference to the display space requirement in the cells.

U.S. Pat. No. 6,067,070 describes a "Display Control Apparatus Having A Display Of Text Data And Image Data And Display Control Method For The Same". In this invention the size of the cells is not determined based on the amount of data to be displayed therein. As a result, all the data may not be displayed in a cell and thus interactive scrolling may be required in individual cells to read the complete display.

In HTML documents (viewed using user agents such as Internet Explorer) information array displays (i.e., HTML Tables) are formatted automatically, controlled by the system of tags and notations and the length (e.g., width of the longest text element in the column) of the information array elements. The method of column width allocation based on the longest text element in the column generally results in largest width to the column containing the cell with the longest text element. This may result in wasteful allocation of space to that column. There are no methods to minimize this wasteful allocation of display space. In HTML Tables overall height and width limits, if specified, are merely indicative, particularly the height limit. Thus rows containing a disproportionately large information array element will be allocated excessive height leading to space wastage in other cells of such rows and also the overall height of the Table may exceed the specified height limit.

Information about HTML Tables is available at the World Wide Web Consortium website at www.w3.org.

Six International Applications which relate to "Processing Layout Of Text Graphical Objects" have been filed by Curl Corporation, USA and have been published by the World Intellectual Property Organization(WIPO). The details of these applications are as follows:

| # | Intl. Publn. No. | Publn. Date | Intl. Appln. No. |
|---|---|---|---|
| 1. | WO 01/09832 | Feb. 8, 2001 | PCT/US00/19999 |
| 2. | WO 01/09834 | Feb. 8, 2001 | PCT/US00/19655 |
| 3. | WO 01/09835 | Feb. 8, 2001 | PCT/US00/19876 |
| 4. | WO 01/09838 | Feb. 8, 2001 | PCT/US00/19717 |
| 5. | WO 01/09839 | Feb. 8, 2001 | PCT/US00/19769 |
| 6. | WO 01/09840 | Feb. 8, 2001 | PCT/US00/19917 |

These applications do not describe methods for displaying elements of a two dimensional information array within a predetermined two dimensional display space constraint.

There are three trends which highlight the problem of display space constraint:

a) The popularity of windowing environments which enable viewing of several windows at the same time within a single display unit of a computer.

b) The miniaturization of personal computers into notebooks and subnotebooks with smaller display units.

c) The appearance of a number of personal devices, such as pocket PCs, PDAs and internet enabled mobile phones which, though not providing the complete functionality of any personal computer, may prove to be increasingly popular even as mere information handling and communication devices, designed to enhance personal effectiveness, efficiency and convenience. Further technology developments, leading to improved display units and more powerful processors at reduced prices, are bound to make such devices more and more useful and cost effective. In such devices the display space constraint is particularly severe because of the very small display units.

In all three cases there is urgent need for compacted presentation of information to overcome the display space constraint.

Our International Application No: PCT/IN99/00064, filed on: Nov. 16, 1999 and published by the World Intellectual Property Organization (WIPO) with International Publication No.: WO 00/38076 on Jun. 29, 2000 describes methods for abbreviating text in computer software. The same invention is also described in our Indian Patent Application No: 827/BOM/1998 filed on: Dec. 21, 1998 and our U.S. patent application Ser. No. 09/256,286 filed on: Feb. 23, 1999. A U.S. Pat. No. 6,279,018, dated Aug. 21, 2001 has been granted for said invention.

With the increasing use and popularity of miniaturized display devices and availability of automated abbreviation methods there is an urgent need to devise methods for instant and automated formatting of information array displays within predetermined two dimensional display space constraint with optimum allocation and use of the available display space so that wastage of space is minimized and readability of the information is preserved.

SUMMARY OF THE INVENTION

It is therefore an object of the invention to instantly and automatically format information array displays within predetermined two dimensional display space constraints with optimum allocation and use of the available display space such that maldistribution and wastage of space is minimized and maximum possible readability is preserved.

Another object of the invention is to allocate display width to columns or display height to rows and within each column or row, respectively, to allocate height or width, respectively, to each cell so that wastage of display space is minimized.

Yet another object of the invention is to display information array elements including images in addition to or instead of text, wherein the sizes of the images are reduced to cope with display space constraint.

One more object of the invention is to automatically format the display or printing of an information array within a wide range of predetermined two dimensional spaces in computer software.

Another user friendliness related object of the invention is to take away from the user the botheration of determining and redetermining column widths and row heights within a two dimensional display space by automatically and optimally allocating display or print space to elements of any information array, based on the display space requirement of the information array elements.

An applications design related object of the invention is to provide for a versatile automated display formatting function which can be used for instant allocation of display or print space and for formatting and displaying or printing elements of an information array within a wide range of display or print space constraints.

The methods of this invention for displaying elements of an information array within a two dimensional display space constraint include:

1. Determining display space requirement (DSR) for displaying the elements.
2. Moderating the DSR value of any element to determine its moderated display space requirement (ModDSR) value, by reducing the DSR value of said element such that the amount of reduction depends on the difference between the DSR value of said element and a value representative of the DSR values of the elements corresponding to the column or row to which said element corresponds.
3. Reducing images, wherein the proportion of reduction is less for a smaller image and more for a larger image.
4. Measuring the lopsidedness of distribution of larger elements across columns and across rows.
5. Depending upon whether the lopsidedness is greater across columns or across rows, allocating column widths or row heights, respectively, as a first allocation based on ModDSR values or on values obtained by using the ModDSR values and thereafter in a second allocation allocating row heights or column widths, respectively.
6. Checking whether the predetermined two dimensional display space is adequate for displaying the information array elements in a matrix format and, if found to be inadequate, executing the following steps;
   (a) Allocating column widths or row heights in proportion to the total of the DSR values of the elements corresponding to the cells arranged into each corresponding column or row, respectively.
   (b) Within each column or row, allocating height or width, respectively, to cells in proportion to the DSR values of the elements corresponding to the cells within each such column or row, respectively.
   (c) Using a colour or shading pattern in cells to make up for loss of alignment of cells across columns or across rows, respectively.
7. Displaying the elements in the space allocated to the corresponding cells.

How the Objects are Achieved:

Overview

Broadly speaking, in this invention, elements of an information array (i.e., contents) are displayed in cells of a predetermined display format space (i.e., limited size container).

The methods of this invention are aimed at preventing overflow of the contents by minimizing maldistribution and wastage of space while accommodating the elements within the cells.

TERMINOLOGY & DEFINITIONS

In this subsection the terminology and definitions used in this specification are explained.

An information array is a collection of a plurality of information elements. Information elements may include text and/or images and may be arranged in a two dimensional structure. A two dimensional display space constraint is a two dimensional space of limited area within which information elements have to be displayed or printed. Further, the two dimensional space of limited area is defined by a particular width and a particular height (i.e., the limited area has a particular shape). Basically, when a predetermined two dimensional display space is inadequate for displaying elements of an information array, then said available display space becomes a constraining factor (i.e., display space constraint).

A display format may be any of the following:
a) Matrix Format, wherein the format width is allocated to columns and the format height is allocated to rows and the information array elements are displayed in cells formed at the intersection of each column and each row. FIGS. 5-9, 11-13, 15, & 17-20 are examples of Matrix Format.
b) Tall Format, wherein the format width is allocated to columns and within each column the format height is allocated to cells and the information array elements are displayed in said cells. In this format the alignment of cells across columns is not necessarily maintained. FIG. 21 is an example of a Tall Format.
c) Wall Format, wherein the format height is allocated to rows and within each row the format width is allocated to cells and the information array elements are displayed in said cells. In this format the alignment of cells across rows is not necessarily maintained. FIG. 22 is an example of a Wall Format.

Thus the choice of display format indicates the layout of cells within the specified display space constraint. The layout of the cells in the display format is two dimensional—i.e., at least two cells are arranged side by side horizontally and at least two cells are arranged one below the other vertically.

Generally, the sequence and/or arrangement of elements in the information array provides an indication of the corresponding cell in the display format wherein each of the elements has to be displayed. In this specification, phrases such as "column/row of information array" or "elements in a column/row" are used. Such phrases refer to the column/row in the display format in which the corresponding elements of the information array will be displayed.

In this specification, the term "data" has the same meaning as "information" and "information" may include text, numerics and images. Any reference to "display" includes "print" and any reference to "displaying" also includes "printing". In other words, the terms, "data", "display space", "display", "displaying", and "information" are to be interpreted within the broad framework and teachings of this invention.

In some places, phrases such as "reducing text font size", "reduce the font size of text" or "use smaller font size" etc. are used. Some readers may find this confusing because text, as such, does not have an intrinsic font size. In this invention a permitted font size range is defined as comprising of a range of font sizes from a preferred font size to a permitted minimum font size for displaying/printing text. A preferred font size is a font size which would normally be used for viewing text assuming there was ample space with no space constraint. A permitted minimum font size is the font size below which the text becomes unreadable or the reader feels substantial discomfort while reading. Generally, it is preferable to use the largest font size permitted i.e., preferred font size, but due to reasons such as space constraint a font size smaller than the preferred font size (but not smaller than the permitted minimum font size) may be selectively used for displaying/printing text. It is in this context that the abovementioned phrases are used.

"display space requirement" (DSR) is to be understood as:
a) for text, the space required to display the text using any predetermined font type and font size (TxtDSR), and
b) for image, the space required to display the image (ImgDSR), both measured in any unit of measure (UoM) suitable for measurement of the available display space. Thus, the DSR of an element is a quantitative measure of the space (i.e., area) required to display the element.

Notes:
1) Generally, for text, DSR is measured using a uniform font size for all the elements so that the DSRs of the elements can be compared. Also, by measuring DSR of text using the permitted minimum font size it becomes possible to determine whether the available overall display space (i.e., display space constraint) is adequate to accommodate all the elements, as explained in detail in Method 3 hereinafter. Thus, generally, it is preferable to use the permitted minimum font size uniformly to measure DSRs of all the elements.
2) Generally, the widths of text elements measured using a uniform font type and size give an accurate indication of their relative DSRs since the heights of the text elements would be the same.

Generally, a pixel is the UoM in display or print for measuring space. Normally, the height of a pixel is approximately equal to its width.

Context

If, in an information array for display, all the information elements have approximately equal DSR values, then a straightforward allocation of available space equally to all the cells gives optimal results. But this rarely is the case. Generally, in real life situations, large and small information elements are randomly distributed in the information array for display resulting in an inherent tendency towards maldistribution and wastage of space. The methods of this invention are directed towards formatting and compacting information arrays for display such that space allocation is optimal within the specified constraint and maldistribution and wastage of space is minimized, as explained hereinafter.

In prior art, generally, column widths are allocated in proportion to the widths of the largest elements corresponding to each column (e.g., in HTML Tables) subject to certain minimum width norms. This however results in a problem of wasteful allocation of space to such columns where the largest element in any column is disproportionately large compared to other elements corresponding to the column. The methods of this invention are aimed at reducing display space wastage.

Methods

The methods of this invention broadly comprise of:
a) Computation and allocation of two dimensional space to individual cells of the display format.
b) Formatting and displaying the information elements in the space allocated to corresponding cells of the display format.

If a text element needs to be displayed in lesser space, a smaller font size may be used for displaying said text. In other words, DSR of a text element can be reduced by using a smaller font size. Text abbreviation is another method which may be used to represent text information in lesser space. It is possible to control the level of abbreviation vis-a-vis font size reduction as explained in greater detail in Method 1 hereinafter. Generally, the amount of text font size reduction required can be minimized by using methods such as text abbreviation, image size reduction and internal leading space reduction.

In prior art, when faced with the problem of two dimensional space constraint, generally, one of the following two routes may be taken, (a) a general reduction of font sizes for the display format, and (b) disregarding either the height constraint or the width constraint and extending the display format beyond the specified two dimensional constraint.

The methods of this invention are designed to locate the problem areas (i.e., unusually large elements) and to focus on and tackle the problem areas. This is done by using methods of moderated display space requirement based (i.e., less than proportionate) allocation of space in combination with methods such as selective reduction of font sizes, moderate abbreviation of text and substantial reduction of image sizes within cells. In doing this the system reckons factors such as overall two dimensional display space available, DSR of elements to be displayed, lopsidedness in the pattern of distribution of large and small elements, acceptable extent of abbreviation, internal leading space reduction option, scope for image size reduction and font sizes available within the permitted range.

Generally, since large and small information elements are randomly distributed in two dimensional information arrays for display there is an inherent tendency towards maldistribution and wastage of space. For example, in prior art, if one cell in a column contains an unusually large element, then, generally, more width is allocated to that column eventhough all the elements in other cells in that column are much smaller. This causes wastage of space in the cells with smaller elements. Thus the presence of unusually large elements is one of the main causes of maldistribution and wastage of space. To minimize said maldistribution and wastage of space, two approaches are used in this invention namely, Matrix Format and Tall/Wall Format, which are described hereinbelow.

Matrix Format:

In the Matrix Format, allocation of space to individual cells is achieved basically by allocating the required width of the display format to the columns of the format and by allocating the required height of the display format to the rows of the format. A cell is formed at the intersection of a column and a row. Due to random variation of size of individual array elements within each column and each row, even with the most elaborate calculation of column width and row height allocation, the maldistribution of allocated cell space vis-a-vis the size of corresponding array element can only be reduced but not eliminated altogether.

The display space allocated for any element would depend not only on the width of the column but also on the height of the corresponding row. Also the largest elements in any array may not occur all in the same row or in the same column. This invention includes methods to optimize the allocation of column widths and row heights in the Matrix Format after reckoning the display space requirement of every element and the pattern of distribution of large and small elements in the columns and rows.

In minimizing wastage, an important method is moderating (i.e., reducing) the DSR values of the comparatively larger information elements and using the resulting moderated display space requirement (ModDSR) values as one of the important inputs while determining the space to be allocated to the corresponding cells for displaying the elements. Another important method is measuring the lopsidedness of distribution of information elements and based on said measurement deciding whether column widths or row heights should be allocated first (in a first allocation) and whether the problem of maldistribution should be fully tackled through ModDSR based first allocation or through a combination of a first allocation and a second allocation.

Choice of first allocation of column widths or row heights is an important issue, decided based on the users perception or system measurement of whether the larger elements are largely concentrated in one or a few columns, causing column lopsidedness, or in one or a few rows, causing row lopsidedness. In case of column lopsidedness column first allocation is done and in case of row lopsidedness row first allocation is done. If the distribution of larger elements is not lopsided but scattered across rows and columns then column first allocation or row first allocation may be done but the problem of maldistribution should be tackled through both first allocation (partially) and second allocation (for the remaining part) by doing the first allocation based on derivatives of the ModDSR values rather than based on ModDSR values.

Since the larger DSR values are moderated before allocation of space the cells corresponding to the elements with larger DSR values may be allocated lesser than proportionate space and the system may be forced (when it subsequently displays cell elements) to use smaller font sizes in the larger DSR cells compared to the other cells. Selective and minimum required font size reduction (within a user-specified font size range) helps to avoid data overflow in individual cells. Abbreviation of text is also used for this purpose. The system tries to use a combination of methods without overusing any one method. For example, font size reduction is done to the minimum extent required in combination with other methods such as optimized space allocation, text abbreviation, higher image size reduction and internal leading space reduction. This way the system tries to preserve maximum possible readability.

These methods are described in detail in Methods 1, 2, 3, 4, & 8 and the Alternative Embodiments in the detailed description hereinafter.

Tall/Wall Format:

In case of extreme space constraint, the two dimensional space may not be adequate for Matrix Format display. A partial adaptation of the Matrix Format display wherein alignment of cells is ensured along only one of the two dimensions may become necessary. This adaptation nearly fully tackles the maldistribution and wastage of space inherent to Matrix Format.

In Tall/Wall Format, space is allocated first to the columns/rows in proportion to the total DSR of the elements in each column/row, respectively. Within each column/row, space is allocated to individual cells in proportion to the DSR values of the corresponding information elements. In these formats alignment of cells is maintained along any one of the two dimensions and not necessarily along the other dimension. The loss of alignment of the cells along the other dimension may be made up with colour or shading patterns.

This method of space allocation is optimal since the rigidity of matrix layout is overcome and thus maldistribution and wastage of space, which is inherent to the matrix format, is almost completely avoided. Also, because of less wastage, in these display formats a uniform font size with relatively lesser font size reduction can be used in all the cells thus preserving maximum possible readability.

Generally, in Tall/Wall Format higher levels of display format compaction than Matrix Format can be achieved and thus, if the display space constraint is particularly severe, Tall/Wall Format may be quite useful. Generally the user may opt for Tall Format or Wall Format only if alignment of cells across columns or alignment of cells across rows, respectively, is not essential or the loss of alignment of cells is adequately made up with colour or shading patterns.

These methods are described in detail in Methods 1, 2, 3, 5, 6, 7, & 9 and the Alternative Embodiments in the detailed description hereinafter.

It may be noted that, irrespective of whether a uniform font size is used or not, the system does need based font size reduction such that the reduction is kept to the minimum required to accommodate the information array elements within the display format space. Thus, if the available display space for the display format is limited and the DSR values of the information array elements are comparatively large then, generally, the font size reduction in the cells will be greater.

Selection of the range of font sizes should preferably be the user's choice depending on the level of personal reading comfort although system determination of said range is also possible. Users may be given the widest choice for the font types as this does not impact display space requirement as much as font sizes. However font sizes and font types available to the user would necessarily be constrained by the hardware and software used.

Use of font size variation, as described hereinbefore, is not compatible with the practice of using font size variations to emphasize portions of text. Such emphasis may be achieved with the use of variations in font weight or font posture instead. Some users may consider font size variation as suggested herein as going against the considerations of good styling of display. However, for coping with extreme display space constraint it may be necessary to give priority to readability of the display format over styling issues.

Generally, image sizes can be reduced by a much greater proportion than text font sizes, without significant loss of recognizability or readability. Thus, in this invention, if space congestion is severe, images (if any) are compressed by a higher proportion.

In situations of extreme congestion the use of external leading space between lines may not be justified and reduction of a small portion of the internal leading space between lines may well be justified.

Utility

The methods of this invention may be used when any information array is required to be displayed within a two dimensional space constraint. Generally, any two dimensional array containing information elements or such subset of any multidimensional array is provided before the methods of this invention are executed. While allocating space for and displaying the information elements the system tries not to disturb the relative positions of the elements.

This invention can handle a wide range of space constraints, but it cannot format an information array for display if the display space is less than a minimum level. The system initially checks whether the height, width and area constraint are adequate before proceeding.

With the use of this invention, truncation of information (i.e., loss of information) within cells is generally avoided by using (in a controlled manner) methods of optimal space allocation to cells, and DSR reduction methods such as need based font size reduction, abbreviation of text, and image size reduction. Thus, in the output display format of this invention, generally, all information from the source array is visibly represented (sometimes with font size reduction and abbreviation) and there is no need to truncate text or to scroll in cells. Since the methods used in this invention are directed and controlled by the options and parameters specified by the user, the resulting information array displays are unlikely to appear mechanical and inflexible to the users.

The methods of this invention are quite useful as a comprehensive rendering option in extreme two dimensional display space constraint situations, when the existing methods are inadequate. The methods of this invention would also be useful, within user agents, in combination with such of the existing methods as do not interfere and are not incompatible with the methods of this invention. For example, the methods of this invention should be given free play within the parameters set as regards the determination of cell heights and widths, reduced font sizes, reduced image sizes, and extent of abbreviation. But issues such as font type, font weight, font posture, abbreviation procedure, final centering of text lines within each cell, colouring of each cell, choice of border frame around the format and rulings within the format may be determined within the user agents, without violating the basic design guidelines of this invention.

The methods of this invention are designed to cope with severe two dimensional display space constraint. The combination of the methods of this invention is totally automated and (depending on user specified parameters) may yield display space reduction of up to 50-70% with minimal loss of readability. Thus, generally, a display format rendered using these methods can be accommodated within a fraction of the space requirement of a comparable HTML Table rendering. This is made possible by optimal allocation of space to individual columns, rows or cells, and by selective and need based use of smaller font sizes up to any predetermined minimum limit and reduction of image sizes. Additionally, automated abbreviation methods may also be used within indicated acceptable limits.

Preferred & Alternative Embodiments

The several methods of a preferred embodiment of this invention, briefly, are:

1. Obtaining Information Array And Control Parameters & Options
2. Determination Of Available Font Sizes In The Permitted Range
3. Initial Processing And Checking
4. Space Allocation For Matrix Format
5. Font Size Determination And Space Allocation For Tall Format
6. Optimization Of Column Widths In Tall Format
7. Font Size Determination And Space Allocation For Wall Format
8. Font Size Determination, Formatting & Display Within Each Cell For Matrix Format
9. Formatting & Display Within Each Cell For Tall or Wall Format Methods 1 to 9 of the preferred embodiment of this invention are quite effective for automated formatting of text information array displays within a wide range of two dimensional space constraints. The basic functionality of the preferred embodiment may be extended in several ways using alternative embodiments. This disclosure includes five specific alternative embodiments identified as alternative embodiments A, B, C, D, & E. The description of each alternative embodiment explains its need and includes a general description of the alternative embodiment and a specific description of additional or preparatory methods or steps and adaptations or changes in methods or steps of the preferred embodiment. These specific descriptions are generally worded with reference to the specific methods or steps of the preferred embodiment and have complete meaning only when read in the context of the descriptions of the preferred embodiment.

The specific adaptations of methods or steps for alternative embodiments are described separately from Methods 1 to 9 of the preferred embodiment so that the detailed description of Methods 1 to 9 is easier to understand.

The methods of the alternative embodiments of this invention are:
A. Alternative Embodiment For Displaying Information Elements Including Images
B. Alternative Embodiment For Displaying Formats With Joined Cells
C. Alternative Embodiment For Matrix Format Display Using A Uniform Font Size
D. Alternative Embodiment For Formatting of Displays Using Multiple Uniform Font Sizes
E. Alternative Embodiment For Using Abbreviated Text Based DSR End of, 'How The Objects Are Achieved:')

Uses of the Invention:

This invention will be useful if information array elements have to be fitted within the physical constraints of a predetermined two dimensional display or print space.

This invention will be also useful for viewing any stored information array on display devices of different height to width ratios as of desktop, notebook or pocket PC without having to reformat the display interactively or having to scroll.

Use of the methods of this invention generally results in avoidance of data overflow and truncation. The methods also avoid the botheration of precise definition of column widths, row heights and font sizes by the user. This is particularly useful when data in tables is repeatedly updated or the table has to be displayed in different space constraints or different display devices (large or small) with different height to width (i.e., aspect) ratios.

The methods of automated allocation of space to cells of Matrix, Tall, or Wall Format within the overall display or print space constraint and the methods of formatting individual information elements into the corresponding cells in the display format substantially augment user friendliness while viewing information arrays for the following reasons:
a) Matrix, Tall, or Wall Format can be compacted to fit into a wide range of display or print space constraints entirely based on the options set chosen by the user beforehand in accordance with his or her personal preferences.
b) The user is saved the botheration of interactively sizing or resizing the columns and rows of the Matrix, Tall, or Wall Format and formatting or reformatting the elements for display within each cell.
c) If the user would not like to be bothered or is undecided, the system logically and contextually supplies the best options or parameters or default settings to produce generally the most acceptable results.
d) The user may try the function instantaneously with several option sets in sequence or at random and choose the display which he or she likes the most.

Some of the devices in which this invention can be used for taking care of the display space constraint are:
1. Computers with desktop displays,
2. Notebooks,
3. Subnotebooks,
4. Pocket PCs,
5. PDAs,
6. Mobile phones with small displays and, possibly, internet access, and
7. Home appliances and other devices having built-in computing devices with display units and, possibly, internet access.

In these devices this invention will be used in software programs wherein matrices or tabular information are displayed. Such uses in software programs include:
1. In HTML document viewers or user agents:
    Often HTML documents contain information array tables apart from plain text, hyperlinks, and images. The methods of this invention can be programmed as a function/routine in HTML user agents (e.g., Internet Explorer & Netscape Navigator). Thus, in case of a display space constraint while viewing the HTML document, the user can opt to view the tables in compacted format.
2. In spreadsheets:
    Spreadsheets are predominantly used to arrange information in matrix or tabular form. Often, a lot of interrelated information has to be displayed within a spreadsheet and the information elements in the spreadsheet may extend beyond a screen or page. The methods of this invention can be employed in spreadsheets to compact the information array display such that it fits within a screen or page, if the user so desires.
3. In database applications:
    In database applications, generally, data is accumulated and stored in a number of large and small data files. Often, while generating outputs and reports different (though related) data is sourced from different data files and arranged into one information array format for presentation. If such outputs or reports become large and there is need for compacting while viewing or printing, the methods of this invention may be used, if opted by the user.
4. In word processors:
    Apart from plain text, many modern word processors have features for handling information array tables. In case of a space constraint problem the methods of this invention may be used to compact the table for display, if opted by the user.
5. In electronic diaries:
    Electronic diaries contain many pieces of information relating to different days. Sometimes the user may want to see all the information relating to a partcular week or month in a compact format. The methods of this invention may be used in such situations to compact the display of the information array, if opted by the user.

This invention will be useful to:
a) users who view reports in the display screens of desktop PCs at home or office as well as in the smaller display screens of notebooks, subnotebooks or pocket PCs when they are on the move.
b) users who would like to view two or more reports (produced using any application or several applications) simultaneously in the display screen of any desktop PC so that they can study related reports without having to change the reports displays. The methods of the invention include extensions for optimal allocation of the available space between the several report formats.
c) teams of users working together and sharing common databases and report formats on networks such as the Internet using large or small devices with display screens of different sizes, height to width ratios and levels of resolution. Such common use is facilitated by this invention as the users do not have to expend any effort to reformat the report displays interactively to fit within their screens.

Productivity of highly paid knowledge workers is an important concern for organizations around the world. Knowledge workers spend a substantial amount of their time creating, organizing, updating and sharing information, a significant portion of which is organized into tabulated formats.

By instantly executing the task of compacting and formatting information arrays into a wide range of display space constraints and thus saving time and effort, this invention can help improve the productivity of knowledge workers (and other users). Also, the need for having multiple tabulated formats, with the same information but with different formatting information to fit into different space constraints, would be eliminated. Since the methods of this invention take into account the preferences of the users (expressed through options and parameters), the results of this invention will not appear to be mechanical and inflexible to the users.

Though this invention will be particularly useful in small devices with small screens, it will be very relevant even on large screens. This is so because, generally, larger screens are viewed from a greater distance. Thus, whether it is a large screen several feet away from the eye or a tiny head mounted display a few centimeters from the eye, the image formed on the retina of the human eye will be approximately of the same size. Also, even if a person is viewing a very high resolution image on a large screen the resolution of the image formed on the retina of the human eye is limited. In other words, the human eye has two important limitations namely, a) the field of vision in front of the human eye is limited, and b) text characters smaller than a certain font size are difficult to read because the resolution capability of the human eye is limited.

The methods of this invention will be useful for accommodating the maximum amount of information within the limited field of vision (display space constraint) while at the same time preserving readability of information by not reducing the font size below a permitted minimum font size that may be user defined.

The most effective use of this invention may be in combination with the abbreviation methods described in WIPO International Publication No.: WO 00/38076 referred to hereinbefore.

Incorporating the Invention in a Program:

To use the invention in an existing or new software program the methods of the invention would, generally, have to be programmed as a function (or subroutine or class in an object oriented language such as C++) using any computer language and then incorporated into the existing or new program. This means that the program has to be compiled after this new function is added to the program's Map/Library structure and statements calling the function have been added wherever the information array formatting function is required to be used in the program.

BRIEF DESCRIPTION OF THE DRAWINGS

A more complete understanding of the invention may be obtained by reading the following description in conjunction with the appended drawings in which:

FIG. 4 is a rendering of an HTML table using Internet Explorer. This is a typical text matrix titled "Investor versus Speculator";

FIG. 5 is a rendering of the table of FIG. 4 using an embodiment of this invention. It shows a compacted Matrix Format which is approximately 40% smaller than the table of FIG. 4. Parameter AlctnOptn='S' and AvAbrvPc=15;

FIG. 6 is a rendering of the table of FIG. 4 using an embodiment of this invention. It shows a compacted Matrix Format which is approximately 40% smaller than the table of FIG. 4. Parameter AlctnOptn='C' and AvAbrvPc=15;

FIG. 7 is a rendering of the table of FIG. 4 using an embodiment of this invention. It shows a compacted Matrix Format which is approximately 40% smaller than the table of FIG. 4. Parameter AlctnOptn='R' and AvAbrvPc=15;

FIG. 8 is a rendering of the table of FIG. 4 using an embodiment of this invention. It shows a compacted Matrix Format which is approximately 40% smaller than the table of FIG. 4. Parameter AlctnOptn='c' and AvAbrvPc=15;

FIG. 9 is a rendering of the table of FIG. 4 using an embodiment of this invention. It shows a compacted Matrix Format which is approximately 40% smaller than the table of FIG. 4. Parameter AlctnOptn='r' and AvAbrvPc=15;

FIG. 10 is a rendering of the HTML table of FIG. 4 using Internet Explorer with the axis turned 90 degrees;

FIG. 11 is a rendering of the table of FIG. 10 using an embodiment of this invention. It shows a compacted Matrix Format which is approximately 40% smaller than the table of FIG. 10. Parameter AlctnOptn='S' and AvAbrvPc=15;

FIG. 12 is a rendering of the table of FIG. 10 using an embodiment of this invention. It shows a compacted Matrix Format which is approximately 50% smaller than the table of FIG. 10. Parameter AlctnOptn='S' and AvAbrvPc=10;

FIG. 13 is a rendering of the table of FIG. 10 using an embodiment of this invention. It shows a compacted Matrix Format which is approximately 50% smaller than the table of FIG. 10. Parameter AlctnOptn='S' and AvAbrvPc=30;

FIG. 14 is a rendering of an HTML table using Internet Explorer. This is a typical text-numeric matrix titled "Cost Analysis";

FIG. 15 is a rendering of the table of FIG. 14 using an embodiment of this invention. It shows a compacted Matrix Format which is approximately 42% smaller than the table of FIG. 14. Parameter AlctnOptn='S' and AvAbrvPc=25;

FIG. 16 is a rendering of an HTML table using Internet Explorer. This is a typical matrix titled "Calender2" which contains images of various sizes apart from text;

FIG. 17 is a rendering of the table of FIG. 16 using an embodiment of this invention. It shows a compacted Matrix Format which is approximately 60% smaller than the table of FIG. 16. The image sizes have also been reduced, as needed, before display in the cells. Parameter AlctnOptn='S' and AvAbrvPc=20. Unlike other FIGs. ILSROptn='N' in this FIG.—i.e., internal leading space is not reduced;

FIG. 18 is a rendering of the table of FIG. 16 using an embodiment of this invention. It shows a compacted Matrix Format which is approximately 70% smaller than the table of FIG. 16. The image sizes have also been reduced, as needed, before display in the cells. Parameter AlctnOptn='S' and AvAbrvPc=20;

FIG. 19 is a rendering of the table of FIG. 16 using an embodiment of this invention. It shows a compacted Matrix Format which is approximately 70% smaller than the table of FIG. 16. The image sizes have also been reduced, as needed, before display in the cells. Parameter AlctnOptn='S' and AvAbrvPc=20. A different font type—i.e., Arial, instead of Times New Roman—is used in this FIG.;

FIG. 20 is a rendering of the table of FIG. 16 using an embodiment of this invention. It shows a compacted Matrix Format which is approximately 70% smaller than the table of FIG. 16. The image sizes have also been reduced, as needed, before display in the cells. Parameter AlctnOptn='S' and AvAbrvPc=30. All text is displayed using a uniform font size;

FIG. 21 is a rendering of the table of FIG. 16 using an embodiment of this invention. It shows a compacted Tall Format which is approximately 80% smaller than the table of FIG. 16. All cells have a uniform font size. The image sizes have also been reduced, as needed, before display in the cells. Parameter AvAbrvPc=15. Readability would be substantially enhanced with colour or shading patterns to make up for loss of cell alignment horizontally across the columns;

FIG. 22 is a rendering of the table of FIG. 16 using an embodiment of this invention. It shows a compacted Wall Format which is approximately 80% smaller than the table of FIG. 16. All cells have a uniform font size. The image sizes have also been reduced, as needed, before display in the cells. Parameter AvAbrvPc=15. Readability would be substantially enhanced with colour or shading patterns to make up for loss of cell alignment vertically across the rows; and FIG. 23 illustrates the use of shading in a Tall Format. Eventhough the alignment of cells across columns (ie., row alignment of cells) is lost, with shading said loss can be made up. Thus viewers can see the shaded bands of cells and relate them to the corresponding rows.

DETAILED DESCRIPTION OF THE EMBODIMENTS OF THE INVENTION

This invention has many methods which can be used singly or in combination and any embodiment of the invention can contain one or more methods.

For some terms in this description suitable abbreviations are placed alongside in parenthesis. Following such placement the abbreviations are often used instead of the terms in their full form. In this description a number of variables and variable arrays are used while describing the methods. The variable or variable array names are referred to directly without describing how these variables are created since that would be well known to a person skilled in the art.

Generally, the smallest unit of measure (UoM) used for measuring display space in display devices is a pixel. The size of a pixel may be different for different devices. Normally, the height of a pixel is approximately equal to its width. In this invention a pixel is used as the UoM for measuring display space, DSR of text (TxtDSR) & DSR of image (ImgDSR) and the like. In this description, the smallest UoM of a printing device also is termed as a pixel.

Figure 1:
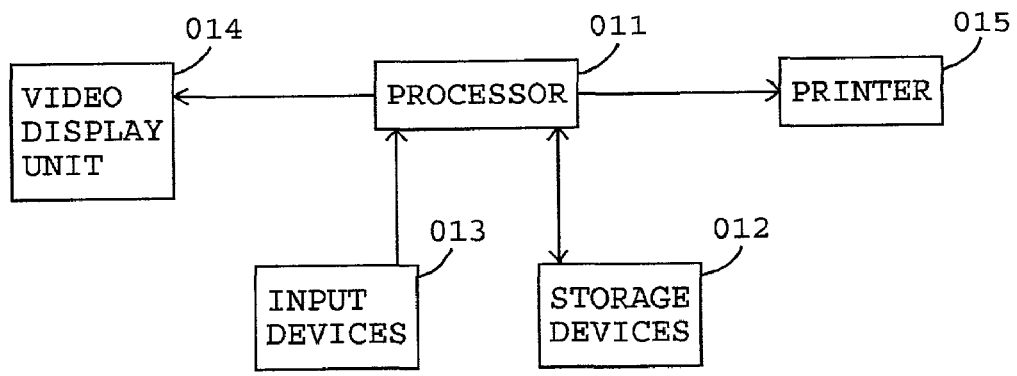
FIG. 1 is a block schematic diagram of a typical computer system.

The methods of this invention can be implemented on any typical computer system. FIG. 1 is a block schematic diagram of a typical computer system used to implement the embodiments of this invention, consisting of a processor 011 and peripheral equipment. Peripheral equipment includes storage devices 012, input devices such as keyboard, stylus or mouse 013, video display unit 014 and (optionally) printer 015. All the aforesaid equipment conform to popular standards and are well known to one of ordinary skill in the art. The computer system or any part of it, other than the input devices and the video display unit, may be shared within local area networks, wide area networks, the Internet or any other system of linked computer networks.

The computer's storage devices 012 may consist of primary storage, such as RAM and secondary storage, such as disk drives, CD ROMs, DVDs, solid state drives and the like. Usually, said storage devices provide the computer-readable medium wherein the methods of this invention are embodied. The specifics as regards what data is read from or written to primary storage and/or secondary storage at each stage of processing impacts the efficiency of processing and safety of data and would be known to one of ordinary skill in the art. Therefore, this detailed description does not differentiate between the different types of storage.

The methods of this invention can also be implemented on a group of two or more networked computing devices wherein some of the methods of the invention are carried out on one device and other methods are carried out on a different device. For example, information array elements may be displayed on a small communication/computing device after the processing methods (e.g., for space allocation) are carried out on a separate (but connected) and more powerful computer.

Figure 2:
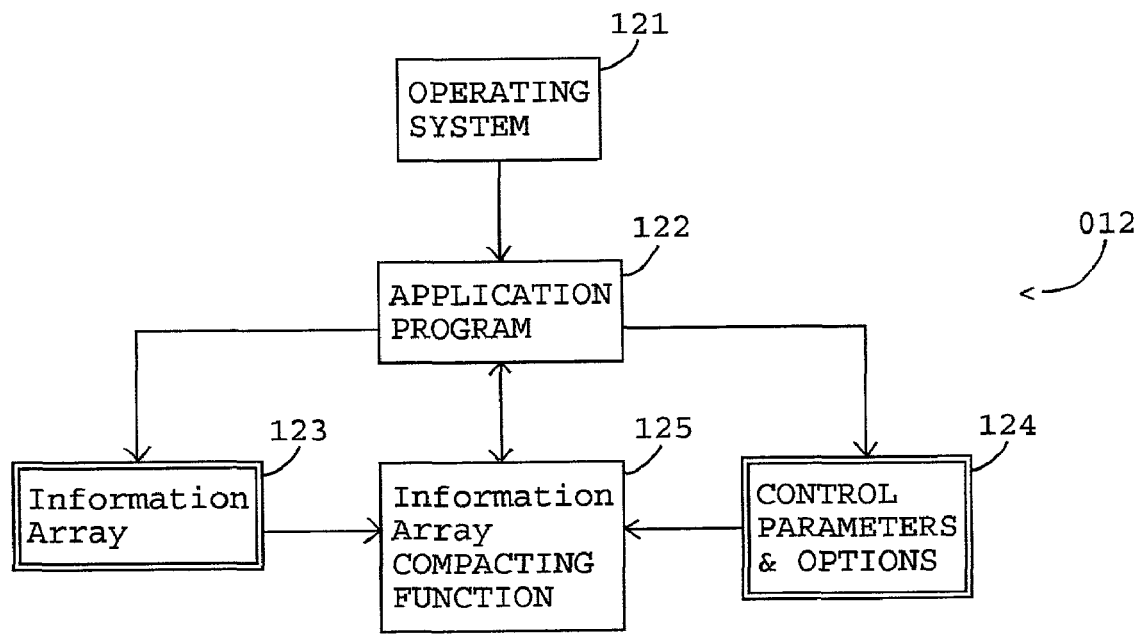
FIG. 2 is a block schematic diagram of an application program wherein this invention is used.

FIG. 2 broadly presents the typical structures of data and programs within the storage devices 012 which are used to implement the embodiments of this invention. These include an operating system 121 (such as MS Windows, Linux or other standard which supports variable font sizes), an application program 122, an information array 123, control parameters & options 124, and an information array compacting function 125. Data structures are represented as double lined blocks. Generally, the application program 122 supplies the information array 123 and control parameters & options 124 and calls the information array compacting function 125 to compact and display the information array within the predetermined two dimensional display space.

Figure 3:
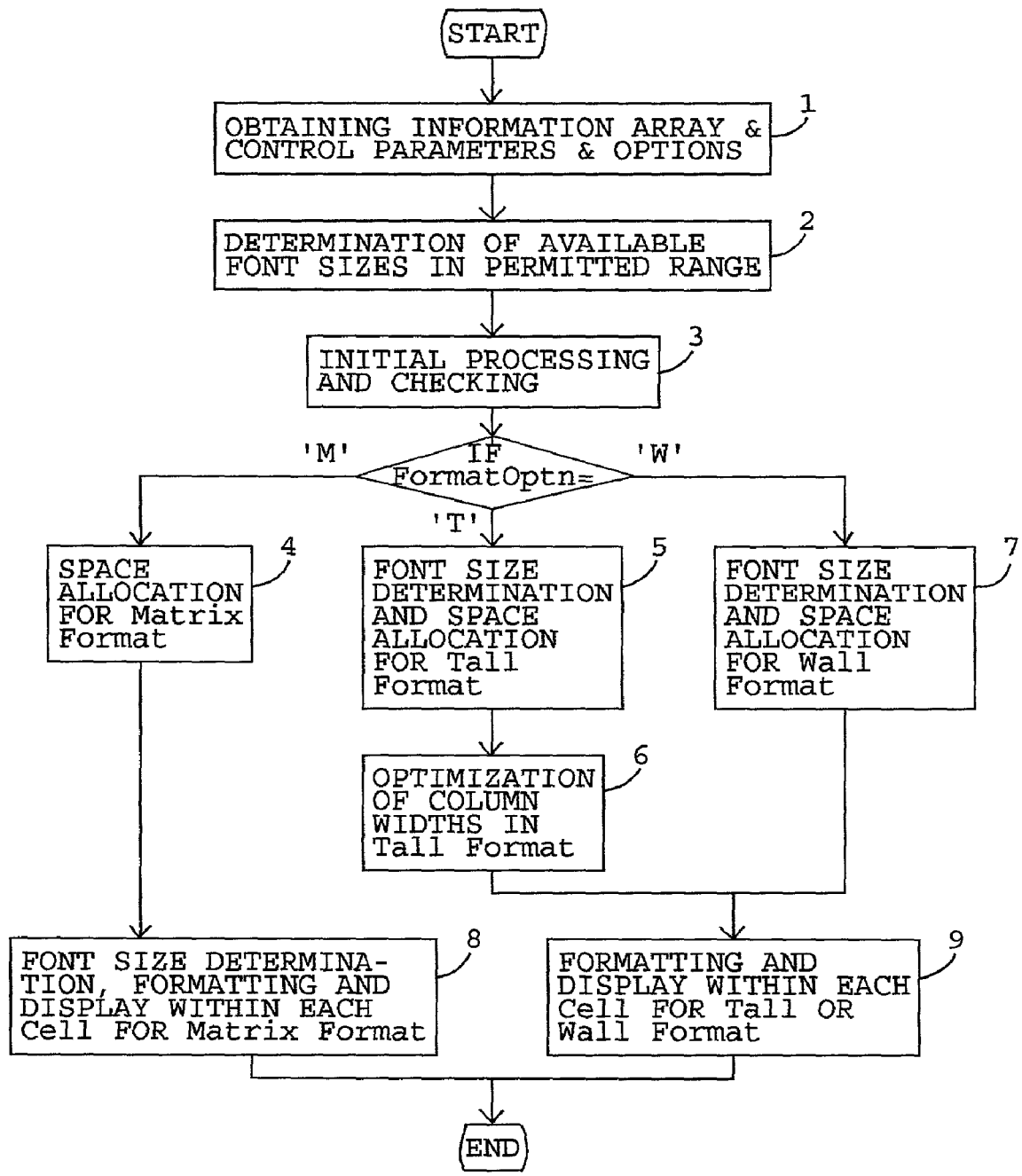
FIG. 3 is a flow chart representation covering the methods of the preferred embodiment of this invention at an overall level.

FIG. 3 is a flow chart representation covering Methods 1 to 9 of the preferred embodiment.

FIGS. 5-9, 11-13, 15, & 17-22 illustrate some compacted display formats generated by using the methods of this invention.

FIGS. 5 to 9 illustrate the different results obtained by using the different AlctnOptn choices for Matrix Format. Generally, system determination (i.e., AlctnOptn='S') gives the best results, since AlctnOptn and DSRPwrFctr (explained later in Method 4 hereinafter) are calculated based on a measure of the lopsidedness in the distribution of the information elements column-wise and row-wise.

FIGS. 12 and 13 illustrate the different results obtained by using low and high values of AvAbrvPc. In FIG. 12 since AvAbrvPc is low greater font size reduction is required in some of the cells. In FIG. 13 since AvAbrvPc is high, lesser reduction in font size is required in the cells.

FIG. 15 illustrates a typical numerics-intensive display format.

FIGS. 17 and 18 illustrate the reduction of image sizes along with text reduction in cells.

FIG. 19 illustrates the use of a different font type. FIG. 20 illustrates the use of a uniform font size.

FIG. 21 illustrates a Tall Format display and FIG. 22 illustrates a Wall Format display. FIG. 23 illustrates the use of shading in a Tall Format display to make up for the loss of alignment of cells across columns (ie., loss of row alignment of cells). Similarly, shading can be used in Wall Format display to make up for the loss of alignment of cells across rows (ie., loss of column alignment of cells). Also, instead of shading, colouring may be used to achieve the same effect in Tall/Wall Format.

When this invention (e.g., in the form of a function or subroutine) is called from within any application program for information array formatting, the calling program passes certain control parameters and options for controlling the information array formatting process.

In the detailed description of the embodiments hereinafter, if any method comprises a plurality of steps, each such step is designated with one or two lower-case alphabets.

The several methods of the preferred embodiment of this invention are:
1. Obtaining Information Array And Control Parameters & Options 1
2. Determination Of Available Font Sizes In The Permitted Range 2
3. Initial Processing And Checking 3
4. Space Allocation For Matrix Format 4
5. Font Size Determination And Space Allocation For Tall Format 5
6. Optimization Of Column Widths In Tall Format 6
7. Font Size Determination And Space Allocation For Wall Format 7
8. Font Size Determination, Formatting & Display Within Each Cell For Matrix Format 8
9. Formatting & Display Within Each Cell For Tall or Wall Format 9

Methods 1 to 3 are common preparatory methods. For Matrix Format, Methods 4 & 8 are also executed. In Method 4 allocation of space to cells is done after moderation of display space requirement of disproportionately large information elements. In Method 8 the information elements are formatted and displayed in the corresponding cells with font size reduction and abbreviation, if necessary.

For Tall Format, Methods 5, 6, & 9 are executed apart from Methods 1 to 3. In Method 5, a uniform font size for all the cells is determined. Then widths are allocated to columns. Within each column, heights are allocated to cells. In Method 6, column widths allocation is optimized. In Method 9, the information elements are formatted and displayed in the corresponding cells with abbreviation, if necessary.

For Wall Format, Methods 7, & 9 are executed apart from Methods 1 to 3. In Method 7, a uniform font size for all the cells is determined. Then heights are allocated to rows. Within each row, widths are allocated to cells. In Method 9, the information elements are formatted and displayed in the corresponding cells with abbreviation, if necessary.

Method 1: Obtaining Information Array and Control Parameters & Options

To begin with, the system needs,
a) an information array containing elements to be displayed in the display format,
b) the number of columns (NoOfCols) and the number of rows (NoOfRows) into which the elements have to be arranged in the display format,
c) relative position of each element for displaying in the display format (e.g., column number and row number).

Preferably, a two dimensional information array may be used for conveying this information. Generally, the information array required to be displayed (i.e., source array) is obtained from a source file such as a text file (e.g., HTML file), spreadsheet file, database file or any other file which can store a group of information elements.

Additionally, an indication of the space constraint within which the information array is to be displayed, is required. One way of indicating a space constraint is by supplying a required height value and a required width value. Alternatively, a user may point (using an input device such as a mouse) to any existing window or any rectangular area within which the display format has to be accommodated. Also, some other parameters and options need to be input or predetermined, as described hereinafter. Thereafter the rest of the methods are executed without user intervention.

It will be appreciated by a person skilled in the art that a two dimensional information array can be readily obtained by selecting elements from a one, two, three or higher dimensional array. Thus, for the purposes of this invention, any information array from which a two dimensional information array can be obtained may be reckoned as a two dimensional information array. Generally, said two dimensional information would be stored in a source file such that it would be accessible for reading.

Also if there is a need for turning (i.e., changing) the axis of the display format, this can be easily achieved. Suppose in a display format the information array elements along a first dimension are displayed in columns and the information array elements along a second dimension are displayed in rows, the axis can be turned 90 degrees by displaying the elements obtained along the first dimension in rows and displaying the elements obtained along the second dimension in columns using the methods of this invention. The methods of this invention are applicable irrespective of which of the two dimensions of the information array is associated with columns and which with rows.

The following control parameters and options are obtained from the calling program (apart from the information array) before the process starts:
a) ReqdWd, being the required width of the display space constraint of any display format as predetermined or user defined, reckoned in terms of pixels or any other suitable unit of measure.
b) ReqdHt, being the required height of the display space constraint of any display format as predetermined or user defined, reckoned in terms of pixels or any other suitable unit of measure.
c) FontType, any font type which is available for use on the computer.
   Note: The preferred embodiment is designed to handle all types of fonts—proportionally spaced and monospaced. Proportionally spaced fonts are most suited for compacted displays. Hence use of monospaced fonts is generally not recommended. However, monospaced fonts may be used if the user has a personal preference for such fonts and the space constraint is not severe.
d) PrefFontSz, being preferred font size, generally defined in terms of point size. The font size defined as PrefFontSz would be the normally used (or default) font size in a situation where there is no space congestion problem.
e) MinFontSz, being permitted minimum font size, generally defined in terms of point size. Generally, MinFontSz would be specified by a user based on his or her minimum required level of reading comfort.
   Note: PrefFontSz and MinFontSz together define a range of font sizes and said range of font sizes may also be referred to as "permitted font size range" in this disclosure.
f) AvAbrvPc, being an acceptable extent (i.e., percentage) of text abbreviation on an average. Default=15.
   Notes:
   1) This control parameter indicates user's relative preferences between font size reduction and text abbreviation. The actual abbreviation done in the cells may be more or less than the indicated percentage.
   2) For a given information array and a given display space constraint if AvAbrvPc is a larger value (i.e., more abbreviation is acceptable) then to that extent the need for font size reduction may be lesser. Conversely, if AvAbrvPc is a relatively smaller value (i.e., high abbreviation is not acceptable) then to that extent the need for font size reduction may be greater. Thus the users can control the amount of abbreviation versus font size reduction.
   3) If the display space requirement using MinFontSz (and including a small provision for unavoidable space wastage inherent to the process) exceeds the available display space by more than AvAbrvPc, the program is exited.

g) FormatOptn, option for choice of the display format. Valid options are:
'M' for Matrix Format.
'T' for Matrix Format or, if Matrix Format is not feasible, Tall Format.
'W' for Matrix Format or, if Matrix Format is not feasible, Wall Format.
'S' for system determination, by selecting between Matrix, Tall, or Wall Format.
Default='M'.

h) AlctnOptn, option for choice of the basis for allocation of column widths and row heights in Matrix Format. Valid options are:
'C' for first allocation of column widths; followed by allocation (i.e., second allocation) of row heights.
'c' for first allocation of column widths based on square roots of highest Moderated DSR values in the columns; followed by allocation (i.e., second allocation) of row heights.
'R' for first allocation of row heights; followed by allocation (i.e., second allocation) of column widths.
'r' for first allocation of row heights based on square roots of highest Moderated DSR values in the rows; followed by allocation (i.e., second allocation) of column widths.
'S' for system determination—i.e., choosing between first allocation of column widths or row heights and computing appropriate derivatives of the highest moderated DSR values in the columns or rows, respectively, to be used as a basis for first allocation; followed by second allocation.
Default='S'.

i) ILSROptn, option for choosing internal leading space reduction: 'Y', if internal leading space between lines is to be reduced, else 'N'. Default='Y'.
Note: The reduction in internal leading space between lines should preferably be 50% or less.

Generally, most of the parameters and options mentioned hereinbefore need not be specified each time this invention is used. Instead, default values or predefined stored parameters sets may be recurrently used. However the parameters ReqdHt and ReqdWd, generally, need to be supplied each time, either by the user or by the system. The values of the parameters and options described hereinabove enable controlled and selective use of the space allocation and display methods described herein.

The data capture program for capturing the control parameters and control options (described hereinbefore) is not described in detail since it would be well known to one of ordinary skill in the art.

In Methods 3, 4, 5, & 7 the system checks for minimum requirements of height, width and area before allocating space for and displaying an information array. It is possible for the system to use that information to automatically determine the minimum ReqdWd and ReqdHt for displaying a given information array.

Method 3, hereinafter, describes steps for using the DSR values of elements to determine the minimum area required (for Matrix Format, by resolving the DSRs into cell widths and cell heights) for Matrix, Tall, and Wall Formats. Methods 4, 5, and 7, hereinafter, describe steps for determining the minimum width and height requirements for Matrix, Tall, and Wall Formats, respectively. Thus, by using these methods, the system can determine the minimum space required to display the information array elements in the selected display format.

In this Method the information array is accessed and each information element is read. The information array may be accessed from a variety of sources e.g., text files (including HTML documents), spreadsheet files, database report files or report files from other applications. The number of columns (NoOfCols) and the number of rows (NoOfRows) of the information array are stored. Each of the information array elements is stored along with its position in the array such that it is readily available while executing the methods of this invention. In the preferred embodiment the information array textual elements are stored in an array named TxtArray which is an array of text strings.

In one embodiment of the invention the information array is accessed from a text file in which the information array has been defined as an HTML table (an HTML document is generally defined in the form of a text file). To recognize rows and fields the system searches for <TR>, <TH> and <TD>. Generally, each row of the HTML table is prefixed with <TR> and each field within a row is prefixed with <TH> or <TD>. Hence rows and fields in a table are easily recognized.

TABLE 1 is a listing of a sample HTML table definition which is an example of a typical information array. The row-wise arrangement of the elements provides an indication of the two dimensional arrangement of the corresponding cells in the display format.

TABLE 1

<TABLE WIDTH="550" BORDER=1>
<CAPTION>Investor Vs Speculator</CAPTION>
<TR><TD>Category
    <TD>Parameter
    <TD>Investor
    <TD>Speculator
<TR><TD ROWSPAN=2>Objective parameter
    <TD>Holding Period
    <TD>An investor has a relatively longer planning horizon, with holding period of at least one year
    <TD>A speculator has a very short planning horizon - from a few days to a few months and involving frequent trading
<TR><TD>Sourcing of funds - Borrowed or own funds
    <TD>An investor uses his own funds & eschews borrowed funds
    <TD>A speculator normally resorts to borrowings to supplement his personal resources
<TR><TD ROWSPAN=3>Subjective parameter
    <TD>Risk profile
    <TD>An investor normally assumes moderate risk. Rarely does he knowingly assume high risk
    <TD>A speculator is ordinarily willing to assume high risk
<TR><TD>Return expectation
    <TD>An investor usually seeks a rate of return higher than that from guilt edged securities and which is commensurate with the limited risk assumed by him
    <TD>A speculator expects a high rate of return for the high risk borne by him
<TR><TD>Basis of decisions
    <TD>An investor studies the fundamental factors and attempts a careful evaluation of the prospects of the business
    <TD>A speculator relies more on market rumours or technical charts
</TABLE>

The method for actually reading a table from any given source (e.g., HTML (text) files, spreadsheets, database files etc.) and storing the cell elements in an information array is not described further as it would be well known to one of ordinary skill in the art.

Method 2: Determination of Available Font Sizes in the Permitted Range

All display units or printer devices may not support a continuous range of font sizes with fine variations. Instead only a few discrete number of font sizes may be supported.

Therefore it is necessary to determine the font sizes, within the permitted size range and required font type, that are possible with the equipment, operating system and the device drivers actually used in a given situation. Thus the system takes into account the characteristics of the display/print device while determining the available font sizes.

In this Method the available font sizes within the range of preferred font size (PrefFontSz) and permitted minimum font size (MinFontSz) are determined. Users may define any appropriate font sizes for PrefFontSz and MinFontSz e.g., PrefFontSz=12 & MinFontSz=9.5. The specific steps for determining the available font sizes within the predefined permitted font size range are as follows:

a) Construct a reference string—i.e., a string of alphabet characters preferably containing at least 10 characters. Construct an empty array named FontSzArray to hold available font sizes. Store PrefFontSz in the first element of FontSzArray.
b) Measure the width of the string using PrefFontSz and store the width in variable PreviousSize. Similarly, measure the width of the string using MinFontSz and store the width in variable SmallestSize.
c) Starting with PrefFontSz as the initial font size, LOOP through steps (d) to (g) as follows:
d) Decrement the font size by 0.1 and measure the width of the string.
e) If the width of the string, as measured with the smaller font size, is equal to SmallestSize,
Store MinFontSz in the next element of FontSzArray.
Exit from this LOOP.
f) Else If the width of the string is equal to PreviousSize,
Go back to Step (d).
g) Else,
Store the current font size in the next element of FontSzArray.
Set PreviousSize=width of the string with current font size.
Go back to Step (d).

Method 3: Initial Processing and Checking

In this Method, initial processing and checking is done to ensure that the information array elements can be accommodated within the available display space in overall compliance with the user's preferences as regards display format structure, permitted font size range and acceptable overall extent of abbreviation. If FormatOptn='S', 'T' or 'W', the system checks whether the two dimensional display space is adequate for Matrix Format display. If adequate, the information array elements can be displayed in Matrix Format, else array elements need to be displayed in Tall or Wall Format. Thus, the display format is decided based on the available two dimensional display space and the information array elements to be displayed therein.

In this Method the following values are determined:
1. Total Separater Space Width,
2. Available Display Space,
3. Display Space Requirement (DSR) of individual elements of the information array using MinFontSz,
4. Total DSR for Tall/Wall Format display (TotDSR),
5. Total DSR for Matrix Format display (MatDSR),
6. Adjusted total DSR for Tall/Wall Format (AdjTotDSR),
7. Adjusted total DSR for Matrix Format (AdjMatDSR).

Generally, the total display space (i.e., ReqdHt*ReqdWd) is not available entirely for displaying information (e.g., text & images). A part of the display space has to be set aside for separater space. Separater space is the blank space provided around each cell to clearly demarcate the cell and its contents from adjoining cells.

Generally, separater space is provided along the edges of a cell. But, separater space above the upper edge and below the lower edge of a cell need not be additionally provided since most fonts provide some blank space above and/or below each character and this blank space (e.g., internal leading space) itself can serve as separater space. Providing extra separater space along the upper and lower edges of a cell is not recommended, since this invention is designed for use in display space constraint situations.

In the preferred embodiment, separater space is expressly provided only along the side edges of a cell and not along the upper and lower edges, for the reasons explained hereinbefore. The separater space provided along the side edges of a cell is referred to as vertical separater space hereinafter.

Preferably, the width of the vertical separater space is determined after taking into account the range of the font sizes which are used in the display format. In one embodiment of the invention the width of the vertical separater space is set as equal to the width of the alphabet "i" in the permitted minimum font size (MinFontSz). With this the width of the blank space between two cells positioned side by side will be 2 times the vertical separater space width. Essentially, the width of the vertical separater space should be set to any value which is felt to be adequate for providing clear demarcation of the cells.

In the preferred embodiment, the total separater space is the same irrespective of which display format is used (i.e., Matrix, Tall, or Wall Format).

The separater space may be utilized to draw vertical and horizontal separater lines between the cells and also to draw a rectangle at the edge of the display format space.

In the later part of this Method, the system checks whether the available display space is adequate for accommodating the information array elements (whose DSR is measured using MinFontSz) in the display format specified by FormatOptn. In this Method, DSR of each information array element is measured using MinFontSz since it is the minimum font size permitted and use of uniform font size facilitates comparison of the DSRs of the elements.

In Tall/Wall Format, first, widths/heights are allocated to columns/rows, respectively, in proportion to the total DSR of each column/row. Then heights/widths are allocated to cells within the columns/rows, respectively, in proportion to the DSR of each cell element in the column/row. Thus the row alignment of cells across columns or column alignment of cells across rows is not necessarily maintained. Because of this method of space allocation, usually, there is very little maldistribution and wastage of space. Since space is allocated optimally and wastage of space is minimized, lesser font size reduction is required for displaying the elements (as explained in subsequent Methods hereinafter) thus preserving readability. Available display space is compared with the adjusted total DSR for Tall/Wall Format display (AdjTotDSR, explained hereinbelow) and is reckoned as adequate if it is greater than or equal to AdjTotDSR.

On the other hand in Matrix Format, the alignment of cells across columns as well as across rows has to be maintained. Thus if an element corresponding to a cell is unusually large then its corresponding row and column have to be allocated larger height and width even if other cell elements of the row and column are comparatively smaller. Often such unusually large elements may be randomly present in more than one row and column. Thus, usually, there is substantial whitespace—i.e., wastage of space—in Matrix Format display. This wastage of space is inherent to tabulated formats such as Matrix Format and thus cannot be eliminated altogether, but it is possible to minimize such wastage. First, as described in the detailed steps of this Method hereinbelow, the wastage inherent to Matrix Format is measured. Then, as described in detail in Method 4 hereinafter, the measured value of inherent space wastage is used while doing ModDSR based allocation of space so as to minimize wastage of space.

To check adequacy of available display space for Matrix Format display, said available display space has to be compared with adjusted total DSR for Matrix Format display (AdjMatDSR, explained hereinbelow).

One of the adjustments required to obtain AdjTotDSR and AdjMatDSR is on account of acceptable percentage of text abbreviation on an average (AvAbrvPc).

Another adjustment required to obtain AdjTotDSR and AdjMatDSR is on account of unavoidable space wastage percentage adjustment (USWPcAdj). The unavoidable space wastage is attributable to incidence of:
  i) fractional font height space, being a part of the required height which may be in excess of the font height multiplied by maximum number of lines that can be accommodated using a predetermined font size with ILSROptn='Y' or 'N'.
  ii) fractional blank spaces, occurring at the end of text lines, which are too small to accommodate the next character even with moderate trimming.

Preferably, USWPcAdj should be set in the range of about 5% to 10%. In one embodiment USWPcAdj is set to 5%.

The specific steps of this Method are as follows:
a) Determine, total display space as, $$\text{Total Display Space} = ReqdWd * ReqdHt$$

b) Determine, total separater space width (TotSepSpcWd) for the display format as, $$TotSepSpcWd = NoOfCols * (\text{Width of Vertical Separater Space}) * 2$$

c) Determine, total separater space for the display format as, $$\text{Total Separater Space} = ReqdHt * TotSepSpcWd$$

d) Calculate the available display space, by subtracting the total separater space from the total display space.
e) If any TxtArray element includes text with intervening long sequences of blank space characters, such as after line-breaks or between paragraphs, preferably collapse the text by replacing such sequences with predetermined indicative symbols to form a continuous text string and store the collapsed text in TxtArray.
f) Starting with the first element in TxtArray, LOOP through steps (g) to (i), until all the elements are processed.
g) Measure the width and height of the text string using MinFontSz (after deducting a portion (e.g., up to 50%) of the internal leading space from the height of the text string, if ILSROptn='Y') and ignoring leading and trailing blank space characters.
  Note: Display space requirement of any text string using any monospaced font may be determined by counting the number of characters and multiplying the number by the uniform DSR per character corresponding to the font size used.
h) Multiply the height and width of the text string to obtain the DSR of the text element. Store the DSR in a TxtDSRArray and also add the DSR to a variable TotDSR.
i) If not last element in TxtArray, access next element in TxtArray and go back to step (g).
j) Determine adjusted total DSR as, $$AdjTotDSR = TotDSR * (100 + USWPcAdj - AvAbrvPc)/100.$$

Note: In this step two adjustments are being made to TotDSR,
    a) TotDSR is adjusted upwards to provide for unavoidable space wastage to the extent of USWPcAdj, and
    b) TotDSR is adjusted downwards because to the extent abbreviation is allowed (AvAbrvPc) display space required for displaying text will be lesser.
k) If AdjTotDSR>Available Display Space,
  Exit the program, after displaying a message indicating that available display space is too small for any display format.
l) Determine average value of ReqdWd (AvReqdWd) as, $$AvReqdWd = ReqdWd/NoOfCols;$$

m) Determine average value of ReqdHt (AvReqdHt) as, $$AvReqdHt = ReqdHt/NoOfRows$$

n) Determine required height to width ratio (HtToWdRatio) as, $$HtToWdRatio = AvReqdHt/AvReqdWd.$$

HtToWdRatio represents an average height to width ratio for the cells in the display format calculated with reference to the overall space constraint and the number of columns and rows in the format.

o) Create an empty array named DSRWdArray to store width values of DSR and another empty array named DSRHtArray to store height values of DSR for each information array element.
p) In this step the DSR value of each cell is used to calculate a DSR width (DSRWd) and DSR height (DSRHt) for each cell. The DSR height and DSR width should preferably be calculated in the ratio of HtToWdRatio.
  Thus we have the following two formulae:

$$DSRWd * DSRHt = \text{Cell } DSR, \qquad \text{i)}$$

$$DSRHt/DSRWd = HtToWdRatio. \qquad \text{ii)}$$

Using these two formulae, the formula for cell width can be calculated as, $$DSRWd = \text{Square root of (Cell } DSR/HtToWdRatio)$$

i.e, $DSRWd = (\text{Cell } DSR/HtToWdRatio)^{0.5}$
  Also, cell height can be worked out as, $$DSRHt = \text{Cell } DSR/DSRWd$$

Store DSRWd and DSRHt in the appropriate elements of DSRWdArray and DSRHtArray, respectively for each cell.
q) Starting with the first column, LOOP through steps (r) to (s) until all columns are processed.
r) Select the largest DSRWd value of all the elements in the column and add the value to a variable TotDSRWd.
s) If not last column, access the next column and go back to step (r).
t) Starting with the first row, LOOP through steps (u) to (v) until all rows are processed.
u) Select the largest DSRHt value of all the elements in the row and add the value to a variable TotDSRHt.
v) If not last row, access the next row and go back to step (u).
w) Determine total DSR for Matrix Format (MatDSR) as, $$MatDSR = TotDSRWd * TotDSRHt$$

x) Determine adjusted MatDSR (AdjMatDSR) as, $$AdjMatDSR = MatDSR * (100 + USWPcAdj - AvAbrvPc)/100$$

Note: In this step two adjustments are being made to MatDSR,
  a) MatDSR is adjusted upwards to provide for unavoidable space wastage to the extent of USWPcAdj, and
  b) MatDSR is adjusted downwards because to the extent abbreviation is allowed (AvAbrvPc) display space required for displaying text will be lesser.

y) If AdjMatDSR<Available Display Space and FormatOptn='S', 'T' or 'W',
  Set FormatOptn='M' (i.e., use Matrix Format)
  Go to Method 4.
  Else If AdjMatDSR<Available Display Space and FormatOptn='M',
  Go to Method 4.
  Else If AdjMatDSR>=Available Display Space and FormatOptn='S',
  Go to step (z).
  Else If AdjMatDSR>=Available Display Space and FormatOptn='T',
  Go to Method 5.
  Else If AdjMatDSR>=Available Display Space and FormatOptn='W',
  Go to Method 7.
  Else If AdjMatDSR>=Available Display Space and FormatOptn='M',
  Exit the program, after displaying a message indicating that available display space is too small for Matrix Format.

z) If NoOfCols>NoOfRows,
  Set FormatOptn='T' (i.e., use Tall Format).
  Go to Method 5.
  Else
  Set FormatOptn='W' (i.e., use Wall Format).
  Go to Method 7.

In a variation of the embodiment described in steps (o) to (v), the TotDSRWd may be determined by selecting the elements with the largest DSR values from within each column, calculating DSRWd corresponding to each column as, $$DSRWd = (\text{largest DSR value in column}/HtToWdRatio)^{0.5},$$

and adding up DSRWd values of all the columns. Similarly, the TotDSRHt may be determined by selecting the elements with the largest DSR values from within each row, calculating DSRHt corresponding to each row as, $$DSRHt = (\text{largest DSR value in row} * HtToWdRatio)^{0.5},$$

and adding up DSRHt values of all the rows.

The TotDSR obtained in steps (f) to (i), after processing all the elements, represents the total DSR for the Tall/Wall Format display using MinFontSz. The MatDSR obtained in step (w) represents the total DSR for the Matrix Format display using MinFontSz. The portion of MatDSR which is in excess of the TotDSR is a direct measure of space wastage which is inherent to Matrix Format display. This wastage, expressed as a percentage of MatDSR or TotDSR, provides useful relative measures of the wastage. One such relative measure is used in step (a) of Method 4 described later hereinafter.

Method 4: Space Allocation for Matrix Format

This method is executed only if FormatOptn='M'.

In this Method the system tries to optimally allocate space to cells for displaying information elements such that maldistribution and wastage of space is minimized. In minimizing wastage, an important aspect is moderating (i.e., reducing) the DSR values of the comparatively larger information elements and using the resulting moderated DSR (ModDSR) values as an important input while determining space allocation to the corresponding cells for displaying the elements. Another important aspect is measuring the lopsidedness of distribution of information elements and, based on said measurement, deciding whether column widths or row heights should be allocated first.

Minimization of maldistribution and wastage of space helps ensure that methods such as text font size reduction and abbreviation are used selectively and to the minimum required extent while displaying the information elements (as described in Method 8 hereinafter) thus preserving readability of the elements.

The detailed steps of this Method are arranged into four groups namely, Group 1 to 4:
  i) In Group 1, steps (a) to (k) are executed to determine moderated DSR (ModDSR) values for the elements of the information array.
  ii) In Group 2, steps (l) to (q) are executed to ensure that minimum requirements for column widths and row heights (including totals) are complied with.
  iii) In Group 3, steps (r) to (z) are executed for measuring the lopsidedness of distribution of information elements and based on said measurement determining AlctnOptn and DSRPwrFctr (explained in this Method hereinafter), if opted for by the user with AlctnOptn='S'.
  iv) In Group 4, steps (za) to (zk) are executed to allocate display space to cells by allocating column widths and row heights.

Group 1:

In this Group, ModDSR of each element of the information array is determined.

In Matrix Format, the alignment of cells across columns as well as across rows has to be maintained. Thus if an element corresponding to a cell is unusually large then its corresponding row and column have to be allocated larger height and width even if other cell elements of the row and column are comparatively smaller. Often such unusually large elements may be randomly present in more than one row and column. Thus, usually, there is substantial whitespace—i.e., wastage of space—in Matrix Format display. This wastage of space is inherent to Matrix Format and thus cannot be eliminated altogether, but it is possible to minimize such wastage. First, as described in the detailed steps of Method 3 hereinbefore, the wastage inherent to Matrix Format is measured. Then, as described herein, the measured value of inherent space wastage is used while calculating ModDSR values (i.e., the reduction in DSR values depends on the measured wastage inherent to Matrix Format display). The ModDSR values are used (as described in the steps of Group 4 herein) as a basis for allocation of space so as to minimize wastage of space.

In prior art methods, generally, allocation is based on largest width or DSR of elements (i.e., based only on one value in the column/row, ignoring all the other elements) but that generally leads to maldistribution and wastage of space. The elements which are unusually large and cause problem in columns/rows are not tackled.

In this invention allocation is based on highest ModDSR values in columns/rows. The highest ModDSR value is developed with reference to a value representative of the DSRs of other elements in the column/row. Also since the DSR value of the element being moderated is also taken into account the space allocated to the element with largest DSR is not reduced so drastically that the text cannot be accommodated. By suitably moderating the DSRs of the unusually large elements the system tackles the problem areas and enables accomodation of the two dimensional array within the two dimensional space constraint.

Determination of ModDSR requires a value representative of the DSR values and a moderation % based on a measure of wastage inherent to Matrix Format and in one embodiment the following two values are used:

i) DSR Moderation Reference Value (ModRefVlu), being the average of or any other derivative from the DSR of the elements of each column or row. Generally, ModRefVlu is larger than the smallest DSR and smaller than the largest DSR in the column or row respectively.

ii) DSR Moderation % (DSRModPc), being a percentage value used to moderate DSR values which are disproportionately large compared to other DSR values in the same column or row, so that the wastage of space which is inherent to the matrix structure is minimized. In a preferred embodiment DSRModPc is developed by the system using the formula:

$$DSRModPc=(MatDSR-TotDSR)/MatDSR*100,$$

wherein MatDSR and TotDSR are values generated using methods described in Method 3 hereinbefore.

Note: The proportion of MatDSR value which is in excess of the corresponding TotDSR value is a direct measure of the space wastage which is inherent to the Matrix Format. The space wastage is greater if the larger DSR values vary substantially from the smaller DSR values within each column or row. Thus the formula produces higher values of DSRModPc for higher inherent space wastage in the Matrix Format.

The value of DSR of each element is compared with the ModRefVlu of the corresponding column or row and, if found to be in excess, the excess value is reduced by DSRModPc percent. If not in excess, the DSR value is itself taken to be the ModDSR. For DSR moderation to be effective it is necessary that the ModRefVlu should be substantially lower than the DSR of the larger elements though not less than that of the lowest.

Two types of ModDSR value may be calculated for each information element:

i) Column ModDSR (ColModDSR): being the ModDSR value developed from the DSR of any information element by moderating the DSR with reference to the ModRefVlu of the corresponding column.

ii) Row ModDSR (RowModDSR): being the ModDSR value developed from the DSR of any information element by moderating the DSR with reference to the ModRefVlu of the corresponding row.

To obtain a single value of ModDSR for each information element, a derivative of these two values may be developed. For example, the lower or the average of the two values may be taken as the single ModDSR value. Thus the ModDSR value developed for each cell takes into account maldistribution with respect to its column as well as its row.

The specific steps of Group 1 are:

a) Determine DSRModPc using the formula:

$$DSRModPc=(MatDSR-TotDSR)/MatDSR*100,$$

wherein MatDSR is the value determined in step (w) of Method 3 and TotDSR is the value determined in step (h) of Method 3, after the last element in the TxtArray is processed.

b) Create an empty array named ModDSRArray to store ModDSR for each information array element.

c) Starting with the first column, LOOP through steps (d) to (f), until all columns are processed.

d) Calculate the ModRefVlu being the average DSR of the elements in the column, using the DSR values stored in TxtDSRArray.

e) In each column identify elements with DSR in excess of the ModRefVlu of the column.
For each such element, calculate ColModDSR as =Average DSR+(Excess DSR*(1−(DSRModPc/100)))
For elements where DSR is not in excess of ModRefVlu, set ColModDSR=DSR of element.
Store ColModDSR as the corresponding element of ModDSRArray.

f) If not last column, access the next column and go back to step (d).

g) Starting with the first row, LOOP through steps (h) to (k), until all rows are processed.

h) Calculate the average DSR of the elements in the row, using the DSR values stored in TxtDSRArray.

i) In each row identify elements with DSR in excess of the ModRefVlu of the row.
For each such element, calculate RowModDSR as =Average DSR+(Excess DSR*(1−(DSRModPc/100)))
For elements where DSR is not in excess of ModRefVlu, set RowModDSR=DSR of element.

j) If RowModDSR is less than the corresponding value of ColModDSR as calculated and stored in ModDSRArray in step (e), store RowModDSR in place of ColModDSR as the corresponding element of ModDSRArray.
As a variation of this step, the simple average of ColModDSR (calculated in step (e)) and RowModDSR (calculated in step (i)) may be stored in ModDSRArray instead of storing the lower of the two.

k) If not last row, access next row and go back to step (h).

Thus, as described hereinabove in steps (e) and (i), the average DSR of the elements in the column and the row, respectively, (being a value representative of the DSR values in the column or row) may be used as the ModRefVlu. In a variation of this embodiment the ModRefVlu can be calculated after excluding the DSR of one or more elements of extreme variation before calculating the average DSR of the elements in the column and the row, respectively.

In yet another embodiment any value representative of the DSR of the elements in the columns and the rows, respectively, may be used as the ModRefVlu. Such representative value of the DSR of the elements may be such as the median of the DSRs of the elements or any other derivative value lower than the DSR of the largest element and higher than the DSR of the smallest element.

If the DSRModPc used in steps (e) & (i) is determined to be near zero, there is little moderation. Effectively the column widths are allocated on the basis of the largest DSR values (or derivatives of the largest DSR values) of each column. At the other extreme, if DSRModPc is determined to be near 100 there is nearly complete moderation of DSR values in excess of the average DSR values. Effectively the column widths are allocated on the basis of the average of DSR values (or square root of the average of DSR values) of each column. This basis is the same or nearly the same as the basis of total DSR of each column.

In a preferred embodiment DSRModPc is system determined as described hereinbefore. In another embodiment DSRModPc may be defined and supplied as a parameter by the user, but the inventors do not recommend such user definition since the user may find it difficult to determine the proper value of DSRModPc consistent with the available display space, amount and distribution of information in the array and user preference as regards degree of abbreviation.

Group 2:

In this Group, minimum requirements for column widths and row heights (and totals) are determined to facilitate compliance and ensure that minimum requirements are met.

The specific steps of Group 2 are:

l) Set minimum column width (MinColWd) to a value which is large enough to display at least one upper case character using PrefFontSz. For example, Set MinColWd to approximately the width of the alphabet 'W' measured using PrefFontSz.

m) Create an array named MinColWdArray and set the value of each element corresponding to each column to MinColWd.

If, for any column, MinColWd is less than the width of the widest numeric string measured using MinFontSz, Set the value of the corresponding column element in MinColWdArray to width of the widest numeric string in that column measured using MinFontSz.

n) Calculate the total minimum column width (TotMinColWd) by adding up all the column element values in MinColWdArray.

Calculate the total minimum row height (TotMinRowHt) as, $TotMinRowHt=(NoOfRows)*$(Font Height of any line using Min$FontSz$)

o) If (TotMinColWd>(ReqdWd−TotSepSpcWd)) OR (TotMinRowHt>ReqdHt),

Quit the methods of this invention and display an error message informing about the inadequate ReqdWd/ReqdHt.

p) If (TotMinColwd=(ReqdWd−TotSepSpcWd))

Create an array named ColWdArray to store column widths.

Set the column width of each column to the value stored in the corresponding element of MinColWdArray.

Subsequent steps (zb), (zc), (zi), and (zj) for determining column width (as described in Group 4 hereinafter) do not apply in this case.

q) If TotMinRowHt=ReqdHt,

Create an array named RowHtArray to store row heights.

Set the row height of each row to the height of any line using MinFontSz. Subsequent steps (zd), (ze), (zg), and (zh) for determining row height (as described in Group 4 hereinafter) do not apply in this case.

Group 3:

In Group 1 hereinbefore ModDSR values are determined for all the elements so that they can be used as a basis for allocating display space for the corresponding cells (as described in Group 4 hereinafter). Space may be allocated to cells by first allocating column widths followed by second allocation of row heights or by first allocating row heights followed by second allocation of column widths. A method is needed to decide whether column widths allocation or row heights allocation should be the first allocation for a given information array. In one embodiment parameter AlctnOptn is used for indicating choice between first allocation of column widths or first allocation of row heights.

If first allocation of column widths or row heights is done based on the ModDSR values in the columns or the rows, respectively, then ModDSR based allocation is achieved entirely in the first allocation itself (the allocation of column widths or row heights being directly and fully in proportion to ModDSR values) and thus in the second allocation the row heights allocated or column widths allocated, respectively, would tend towards being equal. This may not be desirable for reasons related to lopsidedness of distribution as described hereinbelow. Since two dimensional space is being allocated, ModDSR based allocation should generally be divided between first allocation and second allocation. To achieve this the first allocation of column widths or row heights may be based on values obtained from ModDSR values—i.e., derivatives of ModDSR values—so that ModDSR based allocation is achieved only partially during said first allocation. Thereafter second allocation should be done for allocating row heights or column widths, respectively, using ModDSR factors of cells in the rows or columns, respectively, wherein said ModDSR factor is obtained for each cell by dividing the ModDSR value of the cell by the width allocated to the corresponding column or by the height allocated to the corresponding row, respectively. In this way, a balanced ModDSR based allocation, partially through first allocation and partially through second allocation, may be achieved. It may be noted that while doing second allocation the system takes into account the ModDSR values of each of the cells as well as the width or height space allocated to the cell in the first allocation and thus only the remaining part of the ModDSR based allocation is done in the second allocation.

A method is needed for obtaining said derivatives of ModDSR values to enable said balanced ModDSR based allocation. The method should also be able to control the relative extent of ModDSR based allocation to be obtained in the first allocation versus in the second allocation.

In one embodiment DSRPwrFctr is used to obtain derivatives of ModDSR values. DSRPwrFctr values can range between 1 to 0.5 and by raising the ModDSR values to the power of DSRPwrFctr suitable derivatives (i.e., values reduced by taking a root) of ModDSR values are obtained for use during first allocation Also, by adjusting the value of DSRPwrFctr in the range of 1 to 0.5 the system can control the amount of reduction in the derivatives of ModDSR values and thus control the extent to which ModDSR based allocation is achieved in the first allocation. For example, if DSRPwrFctr is determined to be 1 or close to 1, then no or little reduction of ModDSR values is achieved (while determining the derivatives) and the ModDSR based allocation is done practically fully in the first allocation itself. On the other hand if DSRPwrFctr=0.5, then ModDSR values are reduced to the square roots of ModDSR values and roughly half of the ModDSR based allocation is achieved in the first allocation. Consequently the remaining half of the ModDSR based allocation is achieved in the second allocation. Intermediate values of DSRPwrFctr can be used to accurately control the balance of ModDSR based allocation.

Lopsidedness of distribution of elements of the information array to be displayed is an important issue which needs to be considered while deciding whether column widths allocation or row heights allocation will be the first allocation and while deciding the balance of ModDSR based allocation between the first allocation versus the second allocation. If the larger elements are largely concentrated in one or a few columns, then the distribution is said to be lopsided across columns. If the larger elements are largely concentrated in one or a few rows, then the distribution is said to be lopsided across rows.

In most information arrays the distribution of elements is lopsided across columns as well as across rows. In such cases column first allocation should be done if the lopsidedness is greater across columns. Similarly, row first allocation should be done if the lopsidedness is greater across rows. Also, DSRPwrFctr should be decided based on the relative difference between the lopsidedness across columns and across rows.

In a preferred embodiment, AlctnOptn should be set to 'S' (system determination) so that the system measures the relative lopsidedness of distribution of elements and based on said measurement sets AlctnOptn to either 'C' or 'R' and determines DSRPwrFctr value. System determination of AlctnOptn and DSRPwrFctr is described in detail in the steps (r) to (z) hereinafter.

Alternatively, a user may specify the AlctnOptn in case he/she can clearly perceive the nature of the lopsidedness. The user may choose between the following values for AlctnOptn:

'C' for first allocation of column widths when lopsidedness across columns is comparatively very high. In this case the system sets DSRPwrFctr=1.

'c' for first allocation of column widths in case lopsidedness is approximately equal across columns and rows. In this case the system sets DSRPwrFctr=0.5.

'R' for first allocation of row heights when lopsidedness across rows is comparatively very high. In this case the system sets DSRPwrFctr=1.

'r' for first allocation of row heights in case lopsidedness is approximately equal across columns and rows. In this case the system sets DSRPwrFctr=0.5.

AlctnOptn='c' & 'r' produce roughly similar (though not identical) results.

The values of AlctnOptn and DSRPwrFctr determined in this Group are used in Group 4 hereinafter while actually allocating space to cells.

The steps (r) to (z) hereinbelow are executed for system determination of AlctnOptn and DSRPwrFctr if opted for by the user (e.g., if AlctnOptn='S').

The specific steps of Group 3 are:

r) Determine total of DSR values of all the elements corresponding to each column (ColDSR).

s) Determine a sample size of the number of columns of largest ColDSR values and of smallest ColDSR values, being a fraction (e.g., ¼, ⅓, ⅖, ½ etc.) of the total number of columns, rounded off to the nearest integer, but not exceeding half of the total number of columns.

t) Arrange the ColDSR values in the ascending or descending sequence.

u) Determine two subtotal values of ColDSR values of an equal number (i.e., of the sample size as determined in step (s)) of the largest ColDSR values and the smallest ColDSR values obtained from the two ends of the sequence of ColDSR values. Thus, if an information array for display contains ten columns and and if the user indicates a sample size of ⅓ (one-third), then one of the subtotal values will be the total of the largest three ColDSR values and the other subtotal value will be the total of the smallest three ColDSR values.

v) Determine column lopsidedness factor (ColLpsdFctr) by dividing the larger subtotal value as obtained in step (u) by the smaller subtotal value obtained therein.

w) Determine total of DSR values of all the elements corresponding to each row (RowDSR) and also row lopsidedness factor (RowLpsdFctr) using steps similar to steps (r) to (v) but processing rows instead of columns.

x) Determine lopsidedness balance factor, $$LpsdBalFctr=ColLpsdFctr/RowLpsdFctr,$$

y) If LpsdBalFctr>=1, set AlctnOptn='C', else set AlctnOptn='R'.

Note: LpsdBalFctr provides an indication of whether lopsidedness is greater across columns or rows. Thus, it is used to determine AlctnOptn.

z) If AlctnOptn='C', $$DSRPwrFctr=ColLpsdFctr/(ColLpsdFctr+RowLpsdFctr)$$

If AlctnOptn='R', $$DSRPwrFctr=RowLpsdFctr/(ColLpsdFctr+RowLpsdFctr)$$

Note: DSRPwrFctr is determined based on the relative lopsidedness across columns and rows.

Thus the measurement of lopsidedness is used as a basis for deciding whether column first allocation or row first allocation will be done and also for determining DSRPwrFctr.

Group 4:

Allocation of space to individual cells is achieved basically by allocating the required width of the display format to the columns of the format and by allocating the required height of the display format to the rows of the format. Allocation of space is done using moderated DSR values or their derivatives.

In this group, column widths and row heights are allocated based on the following values:

i) ModDSR values, developed in Group 1 hereinabove, ii) Minimum requirement values for column widths and row heights, developed in Group 2 hereinabove, iii) AlctnOptn and DSRPwrFctr, as user specified or developed in Group 3 hereinabove.

Essentially, in this Group, space is allocated to cells of the display format by optimally allocating column widths and row heights based on the ModDSR values or their derivatives, wherein the ModDSR values reckon the maldistribution of the information array elements and AlctnOptn and DSRPwrFctr control how the derivatives of the ModDSR values are obtained based on a measure or perception of lopsidedness of distribution of information elements. Additionally, minimum requirements for column widths and row heights are also complied with while allocating space.

Depending on the AlctnOptn chosen or system determined as described in Group 3 hereinabove, the system decides whether first allocation will be of column widths or of row heights (followed by second allocation of row heights or column widths, respectively). Also, DSRPwrFctr, as determined in Group 3 hereinabove, controls how much of the problem of inherent maldistribution and wastage is addressed through first allocation and how much through second allocation.

The specific steps of Group 4 are:

za) If AlctnOptn='C' or 'c',

In this case column widths are allocated in a first allocation followed by allocation of row heights in a second allocation. Thus steps (zb) to (zf) hereinbelow are executed.

Else If AlctnOptn='R' or 'r',

In this case row heights are allocated in a first allocation followed by allocation of column widths in a second allocation. Thus steps (zg) to (zk) hereinbelow are executed.

zb) Create an empty array named ColWdArray to store column widths. Using the ModDSR values as stored in ModDSRArray for each element of the information array, allocate column widths such that the total of all column widths is =ReqdWd−TotSepSpcWd. Store the column widths in ColWdArray.

The basis for allocation of column widths depends on the AlctnOptn chosen by the user. If AlctnOptn='C', allocation of column widths is based on (e.g, is in proportion to) the highest ModDSR value corresponding to each column. If AlctnOptn='c', allocation is based on the square root of the highest ModDSR value (i.e., highest ModDSR value^0.5) corresponding to each column. If user sets AlctnOptn='S' and system decides AlctnOptn='C' and DSRPwrFctr, then the system determined values are used and root of highest ModDSR value (i.e., highest ModDSR value^DSRPwrFctr) is used as the basis.

zc) If the width of one or more columns is less than corresponding predetermined minimum column widths, increase the widths of those columns to the corresponding minimum column widths and decrease the widths of the other columns (having widths greater than the corresponding minimum column widths) proportionately.

zd) Create an empty array named RowHtArray to store row heights. Using the ModDSR values as stored in ModDSRArray for each element of the information array and using the column widths stored in ColWdArray, allocate row heights such that the total of all row heights is = ReqdHt. Store the row heights in RowHtArray.

Allocation of row heights as mentioned hereinabove is done using the following method:

In each row for every cell, calculate row ModDSR factor as =(ModDSR of corresponding element/corresponding Column Width). Allocate row heights in proportion to the highest row ModDSR factor corresponding to each row such that the total of all row heights is = ReqdHt.

ze) If the height of any row is less than a predetermined minimum row height, increase the height of the row to the minimum row height and decrease the height of the other rows (having height greater than minimum row height) proportionately.

zf) Go to Method 8.

zg) Create an empty array named RowHtArray to store row heights. Using the ModDSR values as stored in ModDSRArray for each element of the information array, allocate row heights such that the total of all row heights is = ReqdHt. Store the row heights in RowHtArray.

The basis for allocation of row heights depends on the AlctnOptn chosen by the user. If AlctnOptn='R', allocation of row heights is based on (e.g, is in proportion to) the highest ModDSR value corresponding to each row. If AlctnOptn='r', allocation is based on the square root of the highest ModDSR value (i.e., highest ModDSR value^0.5) corresponding to each row. If user sets AlctnOptn='S' and system decides AlctnOptn='R' and DSRPwrFctr, then the system determined values are used and root of highest ModDSR value (i.e., highest ModDSR value^DSRPwrFctr) is used as the basis.

zh) If the height of one or more rows is less than a predetermined minimum row height, increase the heights of those rows to the minimum row height and decrease the heights of the other rows (having heights greater than the minimum row height) proportionately.

zi) Create an empty array named ColWdArray to store column widths. Using the ModDSR values as stored in ModDSRArray for each element of the information array and using the row heights stored in RowHtArray, allocate column widths such that the total of all columns widths is = ReqdWd−TotSepSpcWd. Store the column widths in ColWdArray.

Allocation of row heights as mentioned hereinabove is done using the following method:

In each column for every cell, calculate column ModDSR factor as =(ModDSR of corresponding element/corresponding Row Height). Allocate column widths in proportion to the highest column ModDSR factor corresponding to each column such that the total of all column widths is =ReqdWd−TotSepSpcwd.

zj) If the width of any column is less than the corresponding minimum column width, increase the width of the column to the minimum column width and decrease the width of the other columns (having widths greater than the corresponding minimum column widths) proportionately.

zk) Go to Method 8.

In the steps of this group described hereinabove, to begin with, column widths and row heights are allocated based on ModDSR values (or derivatives) and thereafter the minimum width and height requirements are checked. If necessary, widths and heights are adjusted to comply with the requirements. In a variation of this embodiment, the minimum required column widths and row heights may be allocated, to begin with. Thereafter, the remaining unallocated width space and height space may be iteratively allocated in small units (e.g., a pixel at a time) to the columns or rows respectively based on ModDSR values or derivatives in relation to the column widths or row heights already allocated.

(End of Group 4)

Space allocation is done with reference to highest ModDSR (or derivative) in a column or row. This does not mean that allocation is based on ModDSR value of only one cell in a column or row. The ModDSR value for each cell is derived from ColModDSR and RowModDSR for that cell. For each cell, ColModDSR and RowModDSR values themselves are obtained by moderating the DSR of the cell elements with reference to the DSR of other elements in the same column or row respectively. Thus if the other elements in the same column or row have high DSR values less moderation will be done (for ModDSR of the cell element) and if the elements have low DSR values more moderation will be done.

Another factor which influences moderation of DSR is DSRModPc. DSRModPc itself is determined based on a measurement of space wastage. Measurement of space wastage in Matrix Format is described in Method 3 hereinbefore. Thus if measured space wastage is higher, then DSRModPc will be higher and greater moderation will be done. Thus the highest ModDSR of a column or row is a value which takes into account (or is influenced by) the DSR value of other elements and wastage of space. Thus by using the methods of this invention optimal allocation of space is achieved.

Thus, allocation of space in this method is guided by two main factors, i) ModDSR values of elements, and ii) AlctnOptn & DSRPwrFctr, which control whether column allocation or row allocation should be the first allocation and in what proportion the first allocation and the second allocation are used to take care of the problem of inherent maldistribution.

Method 5: Font Size Determination and Space Allocation for Tall Format

This method is executed only if FormatOptn='T'.

In this method, first, space is allocated to columns based on the total DSR of each of the columns and then, within each column, space is allocated to the cells based on the DSR of each of the cells. The row alignment of cells is not maintained. The allocation of the height within each column to its corresponding information elements is handled separately one column at a time. The advantage of this method is more optimal allocation of space between the cells in each column without the compulsion of necessarily maintaining the horizontal alignment of the cells corresponding to each row.

Because of the method used, space allocation is comparatively optimal with very little wastage of space. Since the space allocated to cells is generally in proportion to the DSR of the corresponding elements a uniform font size is selected and used for displaying text in all cells. The largest possible font size (from within the permitted font size range) is selected based on the overall congestion and the acceptable overall level of text abbreviation (indicated by AvAbrvPc). In other words, the minimum necessary font size reduction is done. If the value of AvAbrvPc, as specified by a user, is relatively higher then greater text abbreviation will be possible which will enable selection of a larger uniform font size. The specific steps of this Method are:

a) Starting with PrefFontSz, LOOP through steps (b) to (d), to determine the font size for the display format.
b) Measure the width and height of each text string in TxtArray using the current font size. If ILSROptn='Y', deduct a portion (e.g., up to 50%) of the internal leading space from the height of the text string.
c) Multiply the height and width of the text string to obtain the DSR of the information array element and store it as the corresponding element of TxtDSRArray. Calculate the total DSR of text in all the information array elements to be displayed in the format. If AvAbrvPc>0, then reduce the total DSR of text by AvAbrvPc percent.
d) If the total DSR (determined in step (c)) exceeds the available display space,
   If current font size is MinFontSz,
      Select the current font size.
      Go to next step (e).
   Else
      Set font size to the next smaller size as stored in FontSzArray in Method 2.
      Go back to step (b)
   Else
      Select the current font size.
      Go to next step (e).
e) Set minimum column width (MinColWd) to a value which is large enough to display at least one upper case character using the selected font size. For example, Set MinColWd to the width of the alphabet 'W' measured using the selected font size.
f) Create an array named MinColWdArray and set the value of each element corresponding to each column to MinColWd.
   If, for any column, MinColWd is less than the width of the widest numeric string measured using the selected font size,
      Set the value of the corresponding element in MinColWdArray to width of the widest numeric string in that column measured using the selected font size.
g) Calculate, for each column, the total minimum column width (TotMinColWd) by adding up all the values, corresponding to that column, in MinColWdArray.
   Calculate the total minimum row height (TotMinRowHt) as, $TotMinRowHt = (NoOfRows * MinCelHt)$, where, MinCelHt=Height of any line using selected font size
h) If (TotMinColWd>(ReqdWd−TotSepSpcWd)) OR (TotMinRowHt>ReqdHt),
   Quit the methods of this invention and display an error message informing about the inadequate ReqdWd/ReqdHt.
i) If (TotMinColWd=(ReqdWd−TotSepSpcwd))
   Set the column width of each column to the value stored in the corresponding element of MinColWdArray.
   Subsequent steps (k) to (m) for determining column widths do not apply in this case.
j) If TotMinRowHt=ReqdHt,
   Set the height of each cell in each column to the height of any line using the selected font size. Subsequent step (n) for determining cell heights does not apply in this case.
k) If (TotMinColWd<(ReqdWd−TotSepSpcWd)),
   Execute steps (l) to (m).
   Else
   Go to step (n).
l) Calculate total of DSR values of all the text elements corresponding to each column. Allocate width for each column in proportion to the total of DSR values of the columns.
m) If the widths of one or more columns is less than corresponding predetermined minimum column widths, increase the widths of those columns to the corresponding minimum column widths and decrease the widths of the other columns (having widths greater than corresponding minimum column widths) proportionately.
n) If TotMinRowHt<ReqdHt,
   Allocate cell heights, within each column, in proportion to DSR value of each corresponding element. The cell heights are allocated in pixels, expressed in multiples of the font height, such that each cell can accommodate at least one line and the total lines that can be accommodated in all cells within each column add up to NoL, where,
   NoL=Number of lines
      =(integer portion of)(ReqdHt/MinCelHt).
o) Go to Method 6.

As described hereinabove, in this Method width-space is first allocated to columns and within each column height-space is allocated to cells. Because of this method of space allocation, the alignment of cells across columns is not necessarily maintained, but the advantage is that maldistribution and wastage of space is minimized and space allocation is optimum. Since wastage is minimized, excessive font size reduction of text can generally be avoided, which helps preserve readability of the information.

Method 6: Optimization of Column Widths in Tall Format

This method is executed only if FormatOptn='T' and if (TotMinColWd<(ReqdWd−TotSepSpcwd)).

Normally there would be no need to have this Optimization Method since column widths, apparently, are optimally allocated in Method 5 to minimize congestion in columns and cells. But this optimal allocation is disturbed because the allocation of cell height in proportion to DSR values of elements corresponding to each cell is rounded off to an integer number of lines. In this method column width is reallocated so that the highest cell congestion in the format is minimized.

The specific steps of this Method are:

a) Calculate & store cell congestion factor (CelConFctr) for each element of the information array. CelConFctr is calculated as =DSR of the element/Allocated Cell Space.
b) Determine the sequence number of the column (HColNo) which has the cell with highest CelConFctr.
c) Determine the sequence number of the column (LColNo) which has the cell with lowest CelConFctr, such that its column width is greater than a predetermined minimum column width and LColNo not equal to HColNo.

d) If highest CelConFctr as determined in step (b)=lowest CelConFctr as determined in step (c),
   Go to step (g).
   Else
   Increase the width of the column with the highest CelConFctr by one pixel and decrease the width of the column with the lowest CelConFctr by one pixel.
e) Recalculate the CelConFctrs for all cells in the two columns whose widths were changed in step (d).
f) If the new highest CelConFctr for the format is not lower than the earlier highest CelConFctr as determined in step (b),
   Reverse the changes made in step (d).
   Go to step (g).
   Else
   Go back to step (b).
g) Go to Method 9.

Method 7: Font Size Determination and Space Allocation for Wall Format

This method is executed only if FormatOptn='W'.

In this method, first, space is allocated to rows based on the total DSR of each of the rows and then, within each row, space is allocated to the cells based on the DSR of each of the cells. The row alignment of cells is not maintained. The allocation of the width within each row to its corresponding information elements is handled separately one row at a time. The advantage of this method is more optimal allocation of space between the cells in each row without the compulsion of necessarily maintaining the vertical alignment of the cells corresponding to each column.

Because of the method used, space allocation is comparatively optimal with very little wastage of space. Since the space allocated to cells is generally in proportion to the DSR of the corresponding elements a uniform font size is selected and used for displaying text in all cells. The largest possible font size (from within the permitted font size range) is selected based on the overall congestion and the acceptable overall level of text abbreviation (indicated by AvAbrvPc). In other words, the minimum necessary font size reduction is done. If the value of AvAbrvPc, as specified by a user, is relatively higher then greater text abbreviation will be possible which will enable selection of a larger uniform font size.

The specific steps (a) to (d) of this Method are identical to steps (a) to (d) of Method 5 and are executed first. The specific steps (e) to (o) of this Method are:
e) Set minimum column width (MinColWd) to a value which is large enough to display at least one upper case character using the selected font size. For example, Set MinColWd to the width of the alphabet 'W' measured using the selected font size.
f) Create an array named MinCelWdArray and set the value of each element corresponding to each cell in each row to MinColWd.
   If the element corresponding to a cell contains a numeric string and MinColWd is less than the width of the numeric string measured using the selected font size,
      Set the value of the corresponding cell element in MinCelWdArray to width of the numeric string in that cell measured using the selected font size.
g) Calculate, for each row, the total minimum row width (TotMinRowWd) by adding up all the values, corresponding to that row, in MinCelWdArray.
   Calculate the total minimum row height (TotMinRowHt) as =No. of rows in format*Height of any line using the selected font size.
h) If ((TotMinRowWd>(ReqdWd−TotSepSpcWd)) in any row) OR (TotMinRowHt>ReqdHt),
   Quit the methods of this invention and display an error message informing about the inadequate ReqdWd/ReqdHt.
i) If (TotMinRowWd=(ReqdWd−TotSepSpcwd)) in any row,
   Set the cell width of each cell in the row to the value stored in the corresponding element of MinCelWdArray. Subsequent steps (m) to (n) for determining cell widths in that row do not apply in this case.
j) If TotMinRowHt=ReqdHt,
   Set the row height of each row to the height of any line using the selected font size. Subsequent step (l) for determining row heights does not apply in this case.
k) Calculate total of DSR values of all the elements in each row.
l) If TotMinRowHt<ReqdHt,
   Allocate height for each row in proportion to the total of DSR values of elements corresponding to the row. The row heights are allocated in pixels, expressed in multiples of the font height, such that each row can accommodate at least one line and the total lines that can be accommodated in all rows add up to NoL, where,
   NoL=Number of lines
      =integer portion of (ReqdHt/Height of any line using the selected font size).
m) If (TotMinRowWd<(ReqdWd−TotSepSpcWd)) in any row,
   Allocate cell widths, within each row, in proportion to DSR values of corresponding elements such that the widths add up to (Reqdwd−TotSepSpcWd).
n) If the width of one or more cells in any row is less than a predetermined minimum cell width,
   Increase the width of those cells to the minimum cell width and decrease the width of the other cells (having width greater than minimum cell width) proportionately.
o) Go to Method 9.

As described hereinabove, in this Method height-space is first allocated to rows and within each row width-space is allocated to cells. Because of this method of space allocation, the alignment of cells across rows is not necessarily maintained, but the advantage is that maldistribution and wastage of space is minimized and space allocation is optimum. Since wastage is minimized, excessive font size reduction of text can generally be avoided, which helps preserve readability of the information.

Method 8: Font Size Determination, Formatting & Display Within Each Cell for Matrix Format This method is executed only if FormatOptn='M'.

In this Method, for each element the system determines the minimum font size reduction required to accommodate the element within the corresponding cell space and then displays the element in that cell using the determined font size.

Though, generally, the DSR of each element of any information array is measured initially using the MinFontSz uniformly, the final allocation of available display space to each element for the Matrix Format is based on the moderated DSR values of each element so as to avoid or minimize wastage of space allocated to individual cells.

Accordingly the most optimal layout of the Matrix Format is obtained using font size variations (within the permitted font size range) to make the fullest possible use of space allocated to every cell. Thus, font size is reduced only in the cells which are congested and to the minimum required extent.

Methods such as font size reduction, reduction in leading space between lines of text, text abbreviation and last character trimming may be used to fit an information array element into its allocated cell space.

In a preferred embodiment, no external leading space is provided between adjacent lines. Normally, internal leading space is fully used to provide separation between adjacent lines within a cell. If ILSROptn='Y', the internal leading space between lines is moderately reduced (e.g., by up to 50%). In either case the specific steps described hereinafter are the same.

Since font size reduction is done selectively, mostly in the cells with large DSRs, and to the minimum extent required, overall readability of the display format is preserved.

The specific steps of this Method are:
a) Starting with the first cell in the first column, LOOP through steps (b) to (j), to display every cell element in every column.
b) Determine the position of the top left corner of the cell as follows:
Determine the position of the top edge of the cell by calculating the total height of the rows above the current cell.
Determine the position of the left edge of the cell by calculating the total width of the columns and the vertical separator space width to the left of the current cell.
c) If the element to be displayed is entirely numeric,
Display the element in one line as follows:
Reduce the font size until the numeric element can be accommodated in one line.
Display the numeric in the cell space.
If not last cell of the information array,
Access next cell.
Go back to step (b).
Else
Exit from this method.
d) Starting with PrefFontSz, LOOP through steps (e) to (g), to determine font size for the cell.
e) Determine, using the current font size (with reduction in leading space, if opted), the number of lines (excluding fractions) that can be accommodated in the allocated cell space and determine the usable display space in the cell (CellUDS). CellUDS is the allocated cell space but excluding therefrom the unusable fractional font height space, if any, which may be left while displaying text of a certain font type and font size; and excluding further an estimate of fractional blank space at the end of lines.
f) Determine, using the current font size, the DSR of the element to be displayed in the cell. If AvAbrvPc>0, then reduce the DSR of the element by AvAbrvPc percent.
g) If the DSR (determined in step (f)) exceeds the CellUDS (determined in step (e)) OR
If cell height is less than the current font height,
If current font size is the permitted minimum font size,
Go to step (h).
Else
Set font size to the next smaller size as stored in FontSzArray in Method 2.
Go back to step (e)
Else
Go to step (h)
h) Using text abbreviation/separation methods, abbreviate the text string, separate it into cell width size segments and display the element in the cell space using the current font size.
i) If fractional space is left below the last line, move part of such space (not exceeding half) to above the top line thus centering the text in the cell.
j) If not last cell of the information array,
Access next cell.
Go back to step (b).
Else
Exit from this method.

Method 9: Formatting & Display Within Each Cell for Tall or Wall Format

This method is executed only if FormatOptn='T' or 'W'.

The largest possible font size (i.e., with minimum possible reduction) as selected in steps (a) to (d) of Method 5 or Method 7 is used for display of text elements in all the cells of the display format.

Methods such as reduction in leading space between lines of text, text abbreviation and character trimming may be used to fit an information array element into its allocated cell space.

The specific steps of this Method are:
a) Starting with the first cell of the display format, LOOP through steps (b) to (d), to display every cell element in its allocated cell space.
b) Determine the position of the top left corner of the cell as follows:
Determine the position of the top edge of the cell by calculating the total height of the cells above the current cell.
Determine the position of the left edge of the cell by calculating the total width of the cells and the vertical separator space width to the left of the current cell.
c) Using text abbreviation/separation methods, abbreviate the text string, separate it into cell width size segments and display the text elements in the cell space using the uniform font size.
d) If not last cell of the information array,
Access next cell.
Go back to step (b).
Else
Exit from this method.

In Tall Format, display alignment of cells across columns is lost and, in Wall Format, display alignment of cells across rows is lost. Uniform colour or shading patterns are used in cells to make up for loss of alignment of cells across columns (as illustrated in FIG. 23) or across rows, respectively.

A. Alternative Embodiment for Displaying Information Elements Including Images

The description of Methods 1 to 9 of the preferred embodiment hereinbefore is based on the assumption that the information array to be displayed contains text elements only.

In an alternative embodiment, the information array may contain images in addition to text, for displaying. For example, in an HTML document the presence of an image is indicated by including a tag such as,
<IMG SRC="Picture.bmp">, where "Picture.bmp" is the name of the file containing the image.

For displaying an image inside a cell in an HTML Table, an HTML Tag similar to <IMG SRC="Picture.bmp"> is included after the appropriate <TH> or <TD> HTML Tag. Thus in an HTML Table, it is not difficult to identify cells containing images. The methods of including and accessing images in an HTML Table are not described further since these would be well known to a person of ordinary skill in the art.

If the information array contains text and images, the methods of the preferred embodiment are adapted for producing display formats wherein the text as well as the images are formatted and displayed within the available space constraint. Thus various steps for measuring DSR, allocating space and such other steps are also carried out for images in addition to text.

To cope with the display space constraint, text is represented in smaller font size and image sizes are reduced. While text displays below a certain font size (e.g. point size 9) are not easily readable, large high resolution images even when drastically reduced are generally representative of the original. This characteristic of image reduction is quite useful in coping with display space constraint.

Of the total display space available, the font size limitation imposes certain minimum display space requirements for text, leaving a certain predetermined portion for display of all the images irrespective of their total DSR. In a preferred embodiment of this invention the display space requirement for each image is reduced at the outset such that reduction in image sizes is more in case of greater congestion, the proportion of reduction is lesser for smaller images and more for the larger images and also such that the total of the reduced image sizes approximates a predetermined portion of the total display space.

The DSR of each cell, reckoned using the permitted minimum font size for the text and the reduced image size for the image, is used as a basis for computing the overall congestion and for optimal allocation of column widths and row heights or cell sizes.

However optimal allocation of space between columns and rows does not ensure uniform congestion in all individual cells. Therefore while formatting each cell it is necessary to reckon the congestion (i.e., DSR/Space Allocated) in each cell and to accordingly decide the font size and the final image size in each cell. Even when a uniform font size is used for text (e.g., in Tall/Wall Format) it may be necessary to optimize the final image size to ensure that there is no undue wastage of space or excessive abbreviation of text.

The following definitions are pertinent in this embodiment.
1. Image Reduced DSR (ImgRdcdDSR): being the reduced value obtained by reducing the ImgDSR.
2. Image Reduced Height (ImgRdcdHt): being the height calculated from the ImgRdcdDSR while maintaining the height to width ratio of the image being reduced.
3. Image Reduced Width (ImgRdcdWd): being the width calculated from the ImgRdcdDSR while maintaining the height to width ratio of the image being reduced.

While processing the following arrays are used to store values: ImgNmArray, ImgHtArray, ImgWdArray, ImgDSRArray, ImgFctrArray, ImgRdcdDSRArray, ImgRdcdHtArray, and ImgRdcdWdArray.

The specific Adaptations (numbered (1) to (23)) of the Methods are described hereinafter in four groups.

The first group of Adaptations which are common to Matrix, Tall, and Wall Formats comprises:
1) In Method 1, add:
   While accessing information array elements, recognize the cells containing an image and store the name of the image file in the corresponding element of ImgNmArray.
2) In Method 1, add:
   Measure and store the height and width of each image in the corresponding elements of ImgHtArray and ImgWdArray respectively. Calculate DSR of each image by multiplying its height with its width and store in ImgDSRArray. Store the total of the DSR values of all images in the variable TotImgDSR.

3) In Method 3, add steps (da) to (de) as follows:
   da) Determine, Average Cell Space=(Available Display Space/Number of cells in the Display Format)
       Determine average image space by taking a portion of the average cell space (e.g., half of average cell space). Obtain the total image space by multiplying the average image space with the number of images in the display format.
   db) Determine image base space value by taking lower of smallest image DSR and average image space. The image base space is used as a reference value while reducing the size of all the images.
   dc) For each image, develop image factor by dividing the corresponding DSR by image base space and store in ImgFctrArray. Reduce image factors such that larger image factors (and thus larger images) are reduced by a larger percentage. This can be done by raising the image factors to a power value (PwrVlu) less than 1 (i.e., by taking a root of the image factors).
       The impact of this method is two fold. First, if the average image size is larger compared to image base space (i.e., if congestion is higher), then a lower PwrVlu will be used (i.e., generally, the image sizes will be reduced more). Second, by using the PwrVlu method (i.e., by taking a root of the image factors) it is assumed that comparatively larger images are reduced by a greater proportion than smaller images.
       For example, execute the following substeps repeatedly until the total of ImgRdcdDSR values is less than or equal to available image space or until the reduction in total of DSR values of all images is more than a predetermined percentage (e.g., 96%):
       i) Set PwrVlu=0.99,
       ii) Obtain the reduced image factors by raising each of the image factors to the power PwrVlu,
       iii) Determine ImgRdcdDSR values by multiplying the reduced image factors with the image base space and store in ImgRdcdDSRArray, and
       iv) If the total of ImgRdcdDSR values is greater than available image space and the reduction in total of DSR values of all images is not more than a predetermined percentage, then reduce PwrVlu by 0.002 and Go back to substep (ii), Else, Go to step (dd).
   dd) For each image, determine the ImgRdcdHt and ImgRdcdWd such that (ImgRdcdHt*ImgRdcdWd) is approximately equal to ImgRdcdDSR and the height to width ratio of the image is maintained.
   de) For each image, store ImgRdcdHt and ImgRdcdWd in ImgRdcdHtArray and ImgRdcdWdArray, respectively.
4) In Method 3, the DSR of each information array element should also include DSR of image, if any, as stored in ImgRdcdDSRArray. Accordingly, add step (ha) as follows:
   ha) For each image, add the ImgRdcdDSR to a variable TotImgRdcdDSR.
5) In step (j) of Method 3, determine adjusted total DSR as, $$AdjTotDSR=(TotDSR*(100-AvAbrvPc+USWPcAdj)/100)+TotImgRdcdDSR$$

6) In step (p) of Method 3, the DSR value of each cell should include the corresponding ImgRdcdDSR, if any.
7) In step (x) of Method 3, determine adjusted MatDSR as, $$AdjMatDSR=((MatDSR-TotImgRdcdDSR)*(100-AvAbrvPc+USWPcAdj)/100)+TotImgRdcdDSR$$

The second group of Adaptations which are applicable to Matrix Format only comprises:

8) In Method 4, in steps (a) to (k), the DSR of each information array element should also include DSR of image, if any, as stored in ImgRdcdDSRArray.
9) In Method 8, after step (b), add the following step (ba):
   ba) For each information array element containing an image do the following:
   Check if the ImgRdcdHt or ImgRdcdWd is greater than the height or width respectively of the cell; and if so reduce the height or width further to the cell height or width. Also reduce the width or height proportionately. If the sum of DSR of text and image is greater than the cell space, reduce the image height and image width further (maintaining the height to width ratio) until the sum of DSR of text and image is less than or equal to cell space or until the DSR of the image is reduced to a small fraction (e.g., 10%) of the cell space. Display the image at any (e.g., bottom right) corner of the cell space.
10) In Method 8, steps (d) to (j) are the same except that only a portion of the cell space is available for displaying text where the text lines may have to be of different widths. The text abbreviation/separation methods should be designed to cope with lines of different widths, Further add a step (ia) as follows:
    ia) If excessive blank space is left between the text and the top of the image, move a portion of such space to the bottom of the image, such that the bottom of the image and of the last text line alongside, if any, are aligned as far as possible.

The third group of Adaptations which are applicable to Tall Format only comprises:

11) In Method 5, after step (a), add the following step:
    Calculate available text space by deducting the total of reduced DSR of all images (as determined in Adaptation (3) and stored in ImgRdcdDSRArray) from the available display space.
12) In Method 5, in step (d) replace the first 'If' condition with the following:
    If the total of DSR values of text (determined in step (c)) exceeds the Available Text Space,
13) In Method 5, in step (l), the total columnar DSR of each column should also include reduced DSR of images as stored in ImgRdcdDSRArray.
14) In Method 5, in step (n), the DSR of each information array element should also include reduced DSR of image as stored in ImgRdcdDSRArray.
15) In Method 6, in step (a), the DSR of each information array element should also include reduced DSR of image as stored in ImgRdcdDSRArray.
16) In Method 9, after step (b), add a step similar to that in Adaptation (9).
17) In Method 9, step (c) is the same except that only a portion of the cell space is available for displaying text where the text lines may have to be of different widths.
    The text abbreviation/separation methods should be designed to cope with lines of different widths.

The fourth group of Adaptations which are applicable to Wall Format only comprises:

18) In Method 7, after step (a), add the step as in Adaptation (11).
19) In Method 7, in step (d) replace the first 'If' condition with the condition as in Adaptation (12).
20) In Method 7, in step (k), the total row DSR of each row should also include reduced DSR of images as stored in ImgRdcdDSRArray.
21) In Method 7, in step (m), the DSR of each information array element should also include reduced DSR of image as stored in ImgRdcdDSRArray.
22) In Method 9, after step (b), add a step similar to that in Adaptation (9).
23) In Method 9, step (c) the adaptation is similar to that in Adaptation (17).

FIGS. 17-22 are illustrations of display formats wherein an information array of text and image elements is compacted and displayed.

B. Alternative Embodiment for Displaying Formats with Joined Cells

Some matrices, may have some cells joined along individual rows or columns (i.e., cells that span multiple rows or columns), such joined cells not intersecting each other The simplest adaptation of the methods of the preferred embodiment, to cope with space allocation in such presentations, is to allocate the DSR of the first cell of the joined cells to the individual cells in Method 1, so that space allocation is determined entirely at the individual cell level.

The corresponding cells of the display format are joined as in the original Matrix before accommodating the text of the original Matrix into the display format.

In an HTML document the existence of joined cells is recognized from the occurrence of the word COLSPAN or ROWSPAN in the Tag. For example, <TH COLSPAN=2> indicates that two cells in adjoining columns are joined.

In general, additional parameters passed by the calling program would indicate the position and contents of joined cells.

In an HTML Table, the data content of the joined cells is held entirely in the first of the sequence of joined cells.

In this alternative embodiment, in Tall Format joined cells are permitted only in the first column and in Wall Format joined cells are permitted only in the first row.

The additional steps to allocate the DSR of the first cell of the joined cells in the row to all the joined cells are:
a) selecting the first/next occurrence of a sequence of Joined Row Cells,
b) identifying other rows containing any joined cell within the width of the sequence of Joined Row Cells as selected,
c) determining average cell DSR of each column intersecting the selected sequence of Joined Row Cells, but excluding the DSR values of the cells in the row as selected in step (a) and in the rows as identified in step (b), if any, while calculating the average cell DSR,
d) determining DSR of the first cell of the selected sequence of Joined Row Cells,
e) allocating the DSR determined in step (d) to each of the cells in the selected sequence of Joined Row Cells in proportion to the average cell DSR values of the corresponding intersecting columns as determined in step (c) with suitable adjustments to ensure that the allocated values are integer values adding up to the value determined in step (d).

The additional steps to allocate the DSR of the first cell of the joined cells in the column to all the joined cells are:
a) selecting the first/next occurrence of a sequence of Joined Column Cells,
b) identifying other columns containing any joined cell within the height of the sequence of Joined Column Cells as selected,
c) determining average cell DSR of each row intersecting the selected sequence of Joined Column Cells, but excluding the DSR values of the cells in the column as selected in step (a) and in the columns as identified in step (b), if any, while calculating the average cell DSR, d) determining DSR of the first cell of the selected sequence of Joined Column Cells,
e) allocating the DSR determined in step (d) to each of the cells in the selected sequence of Joined Column Cells in proportion to the average cell DSR values of the corresponding intersecting rows as determined in step (c) with suitable adjustments to ensure that the allocated values are integer values adding up to the value determined in step (d).

FIGS. 5-9, & 11-13 are illustrations of display formats wherein some of the cells are joined.

C. Alternative Embodiment for Matrix Format Display Using a Uniform Font Size

In the preferred embodiment described in Methods 1 to 9 hereinbefore, there is a basic difference in the way font size is determined (within the permitted font size range) for displaying text in cells for Matrix Format on the one hand and for Tall/Wall Format on the other hand. In Matrix Format different largest possible font sizes may be selected and used (within the permitted font size range) in different cells, but in Tall/Wall Format the largest possible uniform font size (within the permitted font size range) is selected and used in all cells.

As explained in the detailed description of Method 8, the most optimal layout of Matrix Format is obtained using font size variations (within the permitted range of font sizes) to make the fullest possible use of space allocated to every cell.

However some users may have a personal preference for Matrix Format displays using uniform font size. The largest uniform font size possible for Matrix format may be smaller than that possible for Tall/Wall Format, because of greater wastage of available space inherent to the matrix structure.

Choice of this alternative embodiment may be indicated, in Method 1, by including FontSzOptn='B'.

The alternative steps required for determination of the largest possible uniform font size for Matrix Format are more involved than the steps (a) to (d) of Methods 5 and 7, which are used to determine the largest possible uniform font size for Tall/Wall Format.

After allocation of cell spaces as described in Method 4 the following specific steps are executed to determine the uniform font size and to display the elements.

The specific alternative steps (a) to (q) are:
a) Select the largest possible uniform font size from within the permitted font size range, starting with PrefFontSz and LOOPing through steps (b) to (o).
b) Starting with the first element in TxtArray, LOOP through steps (c) to (e), until all the elements are processed.
c) Measure the width and height of the text string using current font size after deducting a portion (e.g., up to 50%) of the internal leading space from the height of the text string, if ILSROptn='Y', and ignoring leading and trailing blank space characters.
d) Multiply the height and width of the text string to obtain the DSR of the text element. Store the DSR in TxtDSRArray and also add the DSR to a variable TotDSR.
e) If not last element in TxtArray, access next element in TxtArray and go back to step (c).
f) For each element of TxtDSRArray, divide the DSR value by HtToWdRatio (as determined in Method 3 hereinbefore) and store the square root value of the result, being DSR width value (DSRWd), in the corresponding elements of DSRWdArray; and also divide the DSR value by the corresponding DSRWd value to obtain the DSR height value (DSRHt) and store the DSRWd and DSRHt in the appropriate elements of DSRWdArray and DSRHtArray, respectively.
g) Starting with the first column, LOOP through steps (h) to (i) until all columns are processed.
h) Select the largest DSRWd value of all the elements in the column and add the same to a variable TotDSRWd.
i) If not last column, access the next column and go back to step (h).
j) Starting with the first row, LOOP through steps (k) to (l) until all rows are processed.
k) Select the largest DSRHt value of all the elements in the row and add the same to a variable TotDSRHt.
l) If not last row, access the next row and go back to step (k).
m) Determine total DSR for Matrix Format (MatDSR) as, $$MatDSR = TotDSRWd * TotDSRHt$$

n) Determine adjusted MatDSR (AdjMatDSR) as, $$AdjMatDSR = MatDSR * (100 - AvAbrvPc + USWPcAdj)/100$$

o) If AdjMatDSR<Available Display Space or Current Font Size=MinFontSz,
Select current font size as the uniform font size.
Else
Set next smaller font size as the current font size.
Go back to step (b).
p) With the determination of uniform font size, there may be scope for reallocation of row heights to minimize incidence of fractional font height space wastage.

Accordingly one or more rows with the highest proportion of fractional font height space wastage may be located, the height of row or rows so located may be increased to the next higher multiple font height value and the height of row or rows with the lowest proportion of fractional font height space wastage may be reduced, as necessary.

With the reallocation of row heights as described hereinabove it may be necessary to optimize afresh the allocation of column widths of the Matrix Format. This is done using iterative steps similar to those of Method 6 described hereinbefore, except that the CellConFctr of each cell is calculated as in step (a) of Method 6 using the ModDSR of the element or any derivative of the ModDSR of the element instead of the DSR of the element, uniformly for all the elements.
q) Execute Method 9 instead of Method 8 for formatting display of the Matrix Format with this alternative embodiment.

FIG. 20 is an illustration of a Matrix Format wherein a uniform font size is used.

D. Alternative Embodiment for Formatting of Displays Using Multiple Uniform Font Sizes Generally, it is preferable to avoid use of font size variation for stylistic reasons and to use font size reduction only to accommodate information elements in limited space. Thus in Tall/Wall Format and Matrix Format with uniform font size a single font size is used. But in some cases users may want to use font size variations to demarcate or highlight certain sections (i.e., groups of cells) of a display format (e.g., to highlight the titles section). In such situations, when the source file includes indications of different fonts sizes for use in different sections, additional methods are required in this invention (in the form of an alternative embodiment) so that the relative font size differences can be preserved while formatting the display formats as per the methods of this invention.

The method for formatting of displays using multiple uniform font sizes is similar to the methods used for Tall/Wall Format and for Matrix Format with uniform font size, except that adaptations are required to accommodate multiple uniform font sizes. The system notes the relative (i.e., not absolute) font size differences between groups of cell elements in the source file. While using the methods of this invention, the system tries to preserve the relative font size differences by assigning the preferred font size to the cell elements with the largest font size in the source file, the next smaller font size to the elements in the source file cells with next smaller font size and so on.

In case font size reduction is required to accommodate the information elements within the space constraint the next smaller set of multiple uniform font sizes is used—i.e., the font sizes of elements in all the cells are reduced to the next smaller sizes respectively. Thus the relative font size differences between the different sections is preserved. It may be noted that the permitted minimum font size restriction is complied with while reducing font sizes. Thus in severe space constraint situations, two or more of the sections, which had different font sizes in the source file, may have to be reduced to the same permitted minimum font size.

Choice of this alternative embodiment may be indicated, in Method 1, by including FontSzOptn='C'.

This alternative embodiment requires the following adaptation of Methods 1, 3, 5, 7, & 9:
a) In Method 1, also read and store in text array the font sizes used for each group of elements with uniform font size (i.e., each for each section).
b) In Method 3, also develop the set of font sizes satisfying the conditions described hereinabove and of which the smallest font size is the MinFontSz.
c) In Method 3, step (g), measure the height and width of text string using the font size, from the set developed in step (b) hereinabove, corresponding to the font size of the element in the source file, instead of using MinFontSz.
d) In Method 5 and 7 and in Alternative Embodiment C., starting with the font size set of which the largest font size is the PrefFontSz, iteratively select the largest possible uniform font size set (instead of the largest possible font size) from within the permitted font size range, using which the text array elements can be accommodated within the available display space.
e) In Method 9, display text elements in each cell using the corresponding font size from within the selected set instead of using the selected font size.

E. Alternative Embodiment for Using Abbreviated Text Based DSR

In one embodiment, in Methods 3, 4, 5, & 7, DSR of information elements is used as a basis while determining allocation of column widths, row heights or space to cells. In an alternative embodiment, allocation of column widths, row heights or cell spaces may be based on the DSR of the elements in an abbreviated form, if so opted, instead of the DSR of the elements in original text form. This variation may be useful because even when a common set of abbreviation methods and data file is used to abbreviate several text elements the proportion of reduction by abbreviation may vary between different text elements depending on the random occurrence of phrases or other segments yielding high reduction by abbreviation. The elements in the abbreviated form may be obtained using one or more of the following steps:
i) replacing a phrase with its corresponding acronym,
ii) replacing a word with its corresponding word abbreviation,
iii) replacing a character sequence within a word with a shorter representative sequence,
iv) deleting a phonetically less significant character, and
v) deleting a blank space character.

These abbreviation methods may also be used, together with other methods, while fitting text elements into corresponding cells for display as described in Methods 8 & 9.

Choice of this alternative embodiment may be indicated, in Method 1, by including AbrvFormoptn='Y'.

In this alternative embodiment, the DSR of elements in abbreviated form is reckoned. Therefore, the need for using an acceptable percentage of text abbreviation on an average (AvAbrvPc) is eliminated.

Use of the Invention While Formatting Multiple Information Arrays

The methods of this invention are suitable for automated formatting of two, three or four information arrays into a single window or display space using the following method.

After accessing and storing the selected multiple arrays into several TxtArrays (as described in Method 1), the total DSR of all elements of each array is determined. The total available space is allocated to the display formats of the several arrays in proportion to the total DSR values. The positioning and sizing of the display formats of the several arrays in the display space is achieved using the following steps:
a) Categorize each array in the group as type C if the number of columns exceeds the number of rows and as type R otherwise.
b) In case the array group has four arrays and the largest array does not exceed 40% of the sum of the total DSR of all the formats,
   Position array formats 1 and 2 at the top side by side and allocate height such that the space allocated to the two formats bears the same proportion to the display space as the sum of the total DSR values of the two formats to the sum of the total DSR values of all the formats. Allocate width to the two formats in the same proportion as the respective total DSR values. Position array formats 3 & 4 at the bottom side by side and allocate width to each of these in the same proportion as their respective total DSR values.
c) In case all the arrays in the group are of type C, Position and allocate space for all formats in sequence one below the other such that the height of each display format is in proportion to its total DSR.
   In case all the arrays in the group are of type R,
   Position and allocate space for all formats in sequence from left to right such that the width of each display format is in proportion to its total DSR.
   In case the array group has two, three or four arrays and the largest array is of type C,
   Position the format for the largest array at the top of the display space and allocate its height such that the space allocated to the format bears the same proportion to the display space as its total DSR to the sum of the total DSR of all the formats. Position the other array formats in the bottom side by side and allocate width to each of these in the same proportion as their respective total DSR values.
   In case the array group has two, three or four arrays and the largest array is of type R,
   Position the format for the largest array at the left of the display space and allocate its width such that the space allocated to the format bears the same proportion to the display space as its total DSR to the sum of the total DSR of all the formats. Position the other array formats at the right one below the other and allocate height to each of these in the same proportion as their respective total DSR values.

The height and width allocated to each array format (as described hereinbefore) should be supplied for each format as ReqdHt and ReqdWd parameters for formatting each of the array formats using the methods of the invention.

Use of the Invention in Composite Presentations

The methods of the invention as described in the preferred and alternative embodiments may also be used in combination with other known methods for handling composite displays or presentations. Such composite presentations may include columns of multiple line text, graphs or images apart from the display formats of this invention. Generally, changes in the ratio of width to height may not matter for display formats, columns of text or graphs but such changes may distort an image. Therefore the positioning and sizing of any image may be determined first and that of the columns of text, graphs and display formats may be determined thereafter.

Using this invention, the display formats may be obtained such that they fit into the gaps that may be left after positioning and resizing the other elements of the presentation, thus providing flexibility while preparing such composite presentations.

Other Variations of the Preferred or Alternative Embodiments

Many more variations of the preferred or alternative embodiments of the invention are possible without departing from the spirit, the essential criteria and the methods of the invention as presented in the background and the description of the invention. The preferred and alternative embodiments are therefore to be considered in all respects as illustrative and not restrictive, the scope of the invention being indicated by the appended claims, rather than by the foregoing description; and all variations which come within the meaning and range of equivalency of the claims are therefore intended to be covered by our claims stated hereinafter.

We claim:

1. A computer executable method for displaying elements of an information array within a predetermined two dimensional display space, wherein the predetermined two dimensional display space is divided into cells formed at intersections of columns and rows, the elements of the information array have corresponding cells for display, and at least two of said elements include text, said method comprising the steps of:
    (a) determining display space requirement (DSR) for displaying the elements;
    (b) moderating the DSR value of at least one element to determine its moderated display space requirement (ModDSR) value, wherein said moderating step comprises:
        (i) selecting an element whose DSR value is larger than the DSR value of at least one element in the column or row to which said element corresponds; and
        (ii) reducing the DSR value of the selected element such that the amount of reduction depends on the difference between the DSR value of said element and a value representative of the DSR values of the elements corresponding to the column or row to which said element corresponds;
    (c) allocating column widths and row heights, based on the ModDSR values or on values obtained by using the ModDSR values, such that the total width of all the columns and the total height of all the rows do not exceed the width and height, respectively, of the predetermined two dimensional display space; and
    (d) displaying the elements in the space allocated to the corresponding cells.

2. The method of claim 1 wherein in step (a) the DSR is determined for any text element using any one of the following steps:
    (a) measuring text using a uniform font size;
    (b) measuring text using a uniform font size which is also the permitted minimum font size;
    (c) measuring text using a uniform font size for each group of elements required to be displayed using a common font size; or
    (d) counting the number of text characters.

3. The method of claim 1 wherein in step (a) the DSR of text elements is determined after abbreviating the text.

4. The method of claim 1 wherein in step (b) the value representative of the DSRs of the elements corresponding to the column or row comprises any one of:
    (a) average of the DSR values of the elements corresponding to the column or row, respectively;
    (b) average of the DSR values of the elements corresponding to the column or row, respectively, excluding one or more of extremely large DSR values or extremely small DSR values;
    (c) median of the DSR values of the elements corresponding to the column or row, respectively; or
    (d) any representative value derived from the DSR values of one or more elements corresponding to the column or row, respectively.

5. The method of claim 1 wherein in step (b) the amount of reduction also depends on a measure of the space wastage which is inherent to a matrix format display.

6. The method of claim 1 wherein in step (c) the highest of said values corresponding to each column or to each row are used as a basis for allocating column widths or row heights, respectively.

7. The method of claim 1 wherein allocating step (c) includes:
    (a) measuring the lopsidedness of distribution of larger elements across columns and across rows; and
    (b) depending upon whether the lopsidedness is greater across columns or across rows, allocating column widths or row heights, respectively, as a first allocation and thereafter in a second allocation allocating row heights or column widths, respectively.

8. The method of claim 1 wherein in step (c) said values obtained by using the ModDSR values depend on a measure of relative lopsidedness across columns and across rows.

9. The method of claim 1 further comprising any one of:
    (a) selecting the largest possible font size, from within a permitted font size range, for accommodating each element within the display space allocated to the corresponding cell;
    (b) selecting the largest possible uniform font size, from within a permitted font size range, for accommodating the elements within the predetermined two dimensional display space; or
    (c) selecting the largest possible set of multiple uniform font sizes, from within a permitted font size range, for accommodating the elements within the predetermined two dimensional display space with font size variations based on relative font size differences indicated in a source file.

10. The method of claim 9 wherein selecting the largest possible font size is supported by at least one of the following steps:
    (a) abbreviating text;
    (b) reducing internal leading space between lines of text; or
    (c) reducing image size.

11. The method of claim 1 wherein said predetermined two dimensional display space is determined by the system by calculating the minimum space required to display the information array elements in matrix format.

12. The method of claim 11 wherein said calculating step is executed with regard to user's preferences relating to at least one of:
   (a) permitted font size range;
   (b) acceptable extent of text abbreviation; or
   (c) internal leading space reduction option.

13. The method of claim 1 wherein one or more elements of the information array include images, in addition to or instead of text strings, and the images are reduced in size to reduce their DSR.

14. The method of claim 13 wherein, while reducing the images, the proportion of reduction is less for a smaller image and more for a larger image.

15. The method of claim 1 wherein at least one cell is a joined cell formed by joining contiguous cells in a column or in a row.

16. The method of claim 1 wherein the displaying step (d) includes printing.

17. A computer system including a computer and programs for displaying elements of an information array within a predetermined two dimensional display space, wherein the predetermined two dimensional display space is divided into cells formed at intersections of columns and rows, the elements of the information array have corresponding cells for display, and at least two of said elements include text, said computer system comprising of:
   (a) means for determining display space requirement (DSR) for displaying the elements;
   (b) means for moderating the DSR value of at least one element to determine its moderated display space requirement (ModDSR) value, wherein said moderating means comprises:
      (i) means for selecting an element whose DSR value is larger than the DSR value of at least one element in the column or row to which said element corresponds; and
      (ii) means for reducing the DSR value of the selected element such that the amount of reduction depends on the difference between the DSR value of said element and a value representative of the DSR values of the elements corresponding to the column or row to which said element corresponds;
   (c) means for allocating column widths and row heights, based on the ModDSR values or on values obtained by using the ModDSR values, such that the total width of all the columns and the total height of all the rows do not exceed the width and height, respectively, of the predetermined two dimensional display space; and
   (d) means for displaying the elements in the space allocated to the corresponding cells.

18. The system of claim 17 further comprising at least one of the following:
   (a) means for specifying acceptable extent of text abbreviation;
   (b) means for specifying permitted font size range;
   (c) means for selecting internal leading space reduction;
   (d) means for selecting allocation of column widths or row heights as a first allocation;
   (e) means for selecting font sizes for display in cells; or
   (f) means for using abbreviated form of text elements for determining DSR values.

19. A computer-readable medium embodying the method in claim 1.

20. A compacted display format generated by employing the method in claim 1.

* * * * *